(12) United States Patent
Orsino et al.

(10) Patent No.: US 12,739,915 B2
(45) Date of Patent: Sep. 15, 2026

(54) HANDLING OF SECONDARY NODE (SN) CONFIGURATIONS DURING MULTI-RAT DUAL CONNECTIVITY (MR-DC) RELEASE

(71) Applicant: Telefonaktiebolaget LM Ericsson (publ), Stockholm (SE)

(72) Inventors: Antonino Orsino, Kirkkonummi (FI); Tahmineh Torabian Esfahani, Sollentuna (SE); Icaro Leonardo Da Silva, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 301 days.

(21) Appl. No.: 18/572,339

(22) PCT Filed: Jun. 22, 2022

(86) PCT No.: PCT/SE2022/050625

§ 371 (c)(1),
(2) Date: Dec. 20, 2023

(87) PCT Pub. No.: WO2023/277764

PCT Pub. Date: Jan. 5, 2023

(65) Prior Publication Data

US 2024/0292478 A1 Aug. 29, 2024

Related U.S. Application Data

(60) Provisional application No. 63/217,252, filed on Jun. 30, 2021.

(51) Int. Cl.
*H04W 76/15* (2018.01)
*H04W 28/06* (2009.01)
(Continued)

(52) U.S. Cl.
CPC ........... *H04W 76/15* (2018.02); *H04W 28/06* (2013.01); *H04W 76/20* (2018.02); *H04W 76/30* (2018.02)

(58) Field of Classification Search
None
See application file for complete search history.

(56) References Cited

U.S. PATENT DOCUMENTS

2019/0387569 A1 12/2019 Martinez Tarradell et al.
2022/0400417 A1 * 12/2022 Zhang .................. H04W 24/08
(Continued)

FOREIGN PATENT DOCUMENTS

EP 3796744 A1 3/2021
WO 2021080481 A1 4/2021

OTHER PUBLICATIONS

International Search Report and Written Opinion dated Mar. 20, 2023 for International Application No. PCT/SE2022/050625 filed Jun. 22, 2022, consisting of 15—pages.
(Continued)

*Primary Examiner* — Kodzovi Acolatse
(74) *Attorney, Agent, or Firm* — Weisberg I.P. Law, P.A.

(57) ABSTRACT

Embodiments include methods for a user equipment (UE) configured for multi-radio access technology dual-connectivity (MR-DC) with a wireless network. Such methods include storing context information related to the UE's MR-DC. The context information includes a configuration associated with a secondary node for the UE's MR-DC. Such methods include receiving, from a master node for the UE's MR-DC, a first message that instructs the UE to release MR-DC and to suspend the UE's connection with the wireless network and, in response to the first message, releasing the MR-DC and suspending the UE's connection with the wireless network. Such methods include discarding at least part of the stored context information in response to
(Continued)

Storing, in the UE, context information related to the UE's MR-DC, wherein the context information includes a configuration associated with a SN for the UE's MR-DC. 2110

Receiving, from a first network node configured as a master node for the UE's MR-DC, a first message that instructs the UE to release MR-DC and to suspend the UE's connection with the wireless network. 2120

Initiating a timer in response to receiving the *RRCReconfiguration* message. 2130

Sending an *RRCReconfigurationComplete* message to the first network node in response to expiration of the timer without receiving an *RRCRelease* message from the first network node. 2140

Refraining from sending an *RRCReconfigurationComplete* message, to the first network node, when the *RRCReconfiguration* message is received with an *RRCRelease* message in a single MAC-layer PDU. 2150

In response to the first message, releasing the MR-DC and suspending the UE's connection with the wireless network 2160

Selecting a target cell, served by the second network node, for resuming the UE's connection with the wireless network 2170

Sending, to the second network node via the target cell, a request to resume the UE's connection with the wireless network. 2175

Receiving, from the second network node in response to the request, a second message instructing the UE to resume the UE's connection to the wireless network. 2180

Discarding at least part of the stored context information related to the UE's MR-DC, in response to one of the following: receiving the first message; a first indication included in or with the first message; or a second indication received from a second network node that is a target node for resuming the UE's connection with the wireless network. 2190 one of the following: receiving the first message; a first indication included in or with the first message; or a second indication received from a target node for resuming the UE's connection with the wireless network.

24 Claims, 19 Drawing Sheets

(51) Int. Cl.
*H04W 76/20* (2018.01)
*H04W 76/30* (2018.01)

(56) References Cited

U.S. PATENT DOCUMENTS

2023/0047744 A1* 2/2023 Wu ................. H04W 36/00837
2024/0260121 A1* 8/2024 Bae ....................... H04W 76/15

OTHER PUBLICATIONS

3GPP TS 36.331 V15.13.0; 3rd Generation Partnership Project; Technical Specification Group Radio Access Network; Evolved Universal Terrestrial Radio Access (E-UTRA); Radio Resource Control (RRC); Protocol specification (Release 15); Mar. 2021, consisting of 966—pages.

3GPP TS 38.331 V15.13.0; 3rd Generation Partnership Project; Technical Specification Group Radio Access Network; NR; Radio Resource Control (RRC) protocol specification (Release 15); Mar. 2021, consisting of 540—pages.

3GPP TSG-RAN WG2 NR AH1807 Meeting R2-1809828 (Revision of R2-1808302); Title: MR-DC bearer management in inactive state; Agenda Item: 10.2.4; Source: Samsung; Document for: Discussion & Decision; Date and Location: Jul. 2-6, 2018, Montreal, Canada, consisting of 5—pages.

3GPP TSG-RAN WG2 #109-e R2-2000330; Title: Major CHO issues not discussed in [108#66][NR Mob]; Agenda Item: 6.9.3.1 Conditional handover—configuration and execution details; Source: Ericsson; Document for: Discussion, Decision; Date and Location: Feb. 24-Mar. 6, 2020; Electronic meeting, consisting of 8—pages.

* cited by examiner

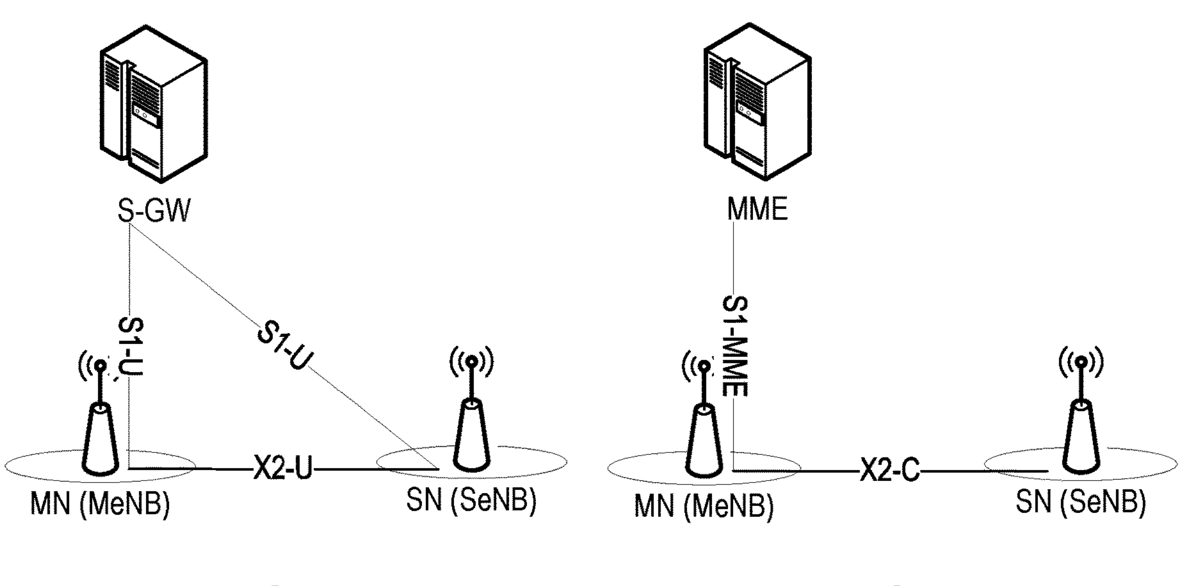
FIG. 4A
FIG. 4B
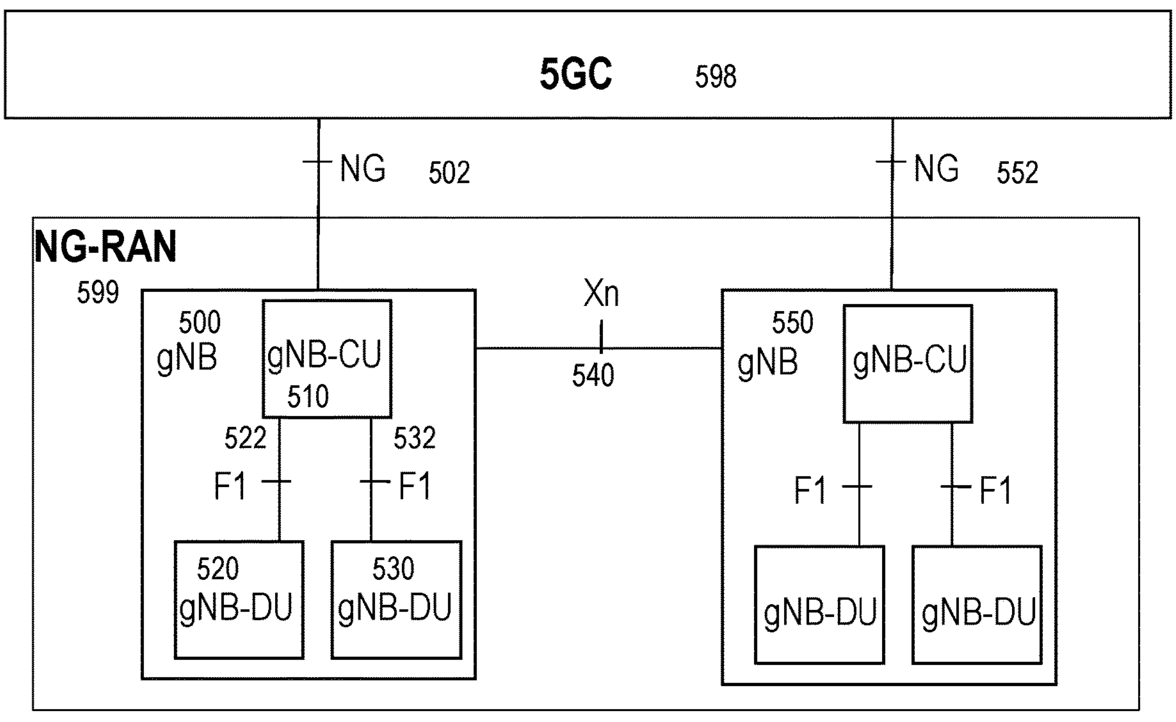
FIG. 5

```
-- ASN1START
-- TAG-RRCRELEASE-START
[…]
RRCRelease-vX-IEs ::=            SEQUENCE {
    mrdc-SecondaryCellGroupConfig   SetupRelease { MRDC-SecondaryCellGroupConfig }  OPTIONAL, -- Need M
[…]
    nonCriticalExtension            SEQUENCE {}                                     OPTIONAL
}
-- TAG-RRCRELEASE-STOP
-- ASN1STOP
```

FIG. 15

```
-- ASN1START
-- TAG-RRCRELEASE-START
[…]
RRCRelease-vX-IEs ::=            SEQUENCE {
    drb-ToReleaseList               DRB-ToReleaseList         OPTIONAL, -- Need M
[…]
    nonCriticalExtension            SEQUENCE {}               OPTIONAL
}
-- TAG-RRCRELEASE-STOP
-- ASN1STOP
```

FIG. 16

HANDLING OF SECONDARY NODE (SN) CONFIGURATIONS DURING MULTI-RAT DUAL CONNECTIVITY (MR-DC) RELEASE

CROSS-REFERENCE TO RELATED APPLICATIONS

This application is a Submission Under 35 U.S.C. § 371 for U.S. National Stage Patent Application of International Application No.: PCT/SE2022/050625, filed Jun. 22, 2022 entitled "HANDLING OF SECONDARY NODE (SN) CONFIGURATIONS DURING MULTI-RAT DUAL CONNECTIVITY (MR-DC) RELEASE," which claims priority to U.S. Provisional Application No. 63/217,252, filed Jun. 30, 2021, entitled "HANDLING OF SECONDARY NODE (SN) CONFIGURATIONS DURING MULTI-RAT DUAL CONNECTIVITY (MR-DC) RELEASE," the entireties of both of which are incorporated herein by reference.

TECHNICAL FIELD

The present disclosure relates generally to wireless networks and more specifically to multi-radio access technology (RAT) dual connectivity (MR-DC) solutions in which a user equipment (UE) is connected simultaneously to two network nodes that use different RATs.

BACKGROUND

Long-Term Evolution (LTE) is an umbrella term for so-called fourth-generation (4G) radio access technologies developed within the Third-Generation Partnership Project (3GPP) and initially standardized in Release 8 (Rel-8) and Release 9 (Rel-9), also known as Evolved UTRAN (E-UTRAN). LTE also includes various improvements to non-radio aspects, based on an Evolved Packet Core (EPC) network. LTE continues to evolve through subsequent releases.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 115 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between UE and EPC and serves as the local mobility anchor for the data bearers when the UE moves between eNBs.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MMEs 134 and 138 via respective S6a interfaces.

In some embodiments, HSS 131 can communicate with a user data repository (UDR)—labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2 illustrates a block diagram of an exemplary control plane (CP) protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both CP and user plane (UP), as well as other UP functions such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE does not belong to any cell, no RRC context has been established for the UE (e.g., in E-UTRAN), and the UE is out of UL synchronization with the network.

Furthermore, in RRC_IDLE state, the UE's radio is active on a discontinuous reception (DRX) schedule configured by upper layers. During DRX active periods (also referred to as "DRX On durations"), an RRC_IDLE UE receives system information (SI) broadcast by a serving cell, performs measurements of neighbor cells to support cell reselection, and monitors a paging channel for pages from the EPC via an eNB serving the cell in which the UE is camping.

A UE must perform a random-access (RA) procedure to move from RRC_IDLE to RRC_CONNECTED state. In RRC_CONNECTED state, the cell serving the UE is known and an RRC context is established for the UE in the serving eNB, such that the UE and eNB can communicate. For example, a Cell Radio Network Temporary Identifier (C-RNTI)—a UE identity used for signaling between UE and network—is configured for a UE in RRC_CONNECTED state.

LTE dual connectivity (DC) was introduced in Rel-12. In DC, an RRC_CONNECTED UE consumes radio resources from at least two different network points connected to each other with a non-ideal backhaul. In LTE, these two network points may be referred to as a "Master eNB" (MeNB) and a "Secondary eNB" (SeNB). More generally, the terms master node (MN), anchor node, and MeNB can be used interchangeably, while the terms secondary node (SN), booster node, and SeNB can also be used interchangeably. DC can be viewed as a special case of carrier aggregation (CA), in which the aggregated carriers (or cells) are provided by network nodes that are physically separated and not connected via a robust, high-capacity connection.

The fifth generation ("5G") of cellular systems, also referred to as New Radio (NR), was first standardized in 3GPP Rel-15. NR is developed for maximum flexibility to support a variety of different use cases. These include enhanced mobile broadband (eMBB), machine type communications (MTC), ultra-reliable low latency communications (URLLC), side-link device-to-device (D2D), and several other use cases. 5G/NR technology shares many similarities with fourth-generation LTE. For example, both PHYs utilize similar arrangements of time-domain physical resources into 1-ms subframes that include multiple slots of equal duration, with each slot including multiple OFDM-based symbols. As another example, NR RRC layer includes RRC_IDLE and RRC_CONNECTED states, but adds another state known as RRC_INACTIVE. In addition to providing coverage via "cells," as in LTE, NR networks also provide coverage via "beams." In general, a DL "beam" is a coverage area of a network-transmitted RS that may be measured or monitored by a UE.

DC is also considered an important feature for 5G/NR networks. Several DC (or more generally, multi-connectivity) scenarios have been considered for NR. These include NR-DC that is similar to LTE-DC discussed above, except that both the MN and SN (referred to as "gNBs") employ the NR interface to communicate with the UE. In addition, various multi-RAT DC (MR-DC) scenarios have been considered, whereby a UE can be configured to uses resources provided by two different nodes, one providing E-UTRA/LTE access and the other one providing NR access. One node acts as MN (e.g., providing MCG) and the other as SN (e.g., providing SCG), with the MN and SN being connected via a network interface and at least the MN being connected to a core network (e.g., EPC or 5GC).

SUMMARY

According to Rel-15 RRC procedures, a UE that is released to RRC_IDLE or suspended to RRC_INACTIVE releases all its MR-DC configurations, e.g., explicitly releasing MR-DC configurations upon resume initiation. In Rel-16, a feature has been introduced to allow a UE to store MR-DC configurations in the UE AS inactive context, if the UE is capable of that. However, there are various problems, difficulties, and/or issues with the handling at MR-DC release of SN-terminated radio bearers whose PDCP entity is hosted at the SN.

Embodiments of the present disclosure provide specific improvements to mobility operations in a wireless network, such as by facilitating solutions to overcome exemplary problems summarized above and described in more detail below.

Embodiments include methods (e.g., procedures) for a UE configured for MR-DC with a wireless network.

These exemplary methods can include storing, in the UE, context information related to the UE's MR-DC, wherein the context information includes a configuration associated with a SN for the UE's MR-DC. These exemplary methods can also include receiving from the MN a first message that instructs the UE to release MR-DC and suspend the UE's connection with the wireless network. These exemplary methods can also include, in response to the first message, releasing the MR-DC and suspending the UE's connection to the wireless network. These exemplary methods can also include receiving, from a target node in the wireless network, a second message instructing the UE to resume the UE's connection to the wireless network. These exemplary methods can also include discarding at least part of the stored context information related to the UE's MR-DC, in response to one of the following:

- receiving the first message;
- a first indication to update stored context information related to the UE's MR-DC, included in or with the first message; or
- a second indication received from a second network node that is a target node for resuming the UE's connection with the wireless network.

In some embodiments, discarding at least part of the stored context information is responsive to the first indication, which is included in in the first message. In some of these embodiments, the first message is an RRCRelease message. In other embodiments, the first message is an RRCReconfiguration message. In some of these embodiments, these exemplary methods can also include initiating a timer in response to receiving the RRCReconfiguration message.

In some variants of these embodiments, in response to receiving an RR(Release message from the first network node before expiration of the timer, the UE can select a target cell, served by the second network node, for resuming the UE's connection with the wireless network and send, to the second network node via the target cell, a request to resume the UE's connection to the wireless network.

In some variants of these embodiments, these exemplary methods can also include sending an RRCReconfiguration-Complete message to the first network node in response to expiration of the timer without receiving an RRCRelease message from the first network node.

In other embodiments, these exemplary methods can also include the following operations: selecting a target cell, served by the second network node, for resuming the UE's connection with the wireless network; sending, to the second network node via the target cell, a request to resume the UE's connection to the wireless network; and receiving, from the second network node in response to the request, a second message instructing the UE to resume the UE's connection to the wireless network.

In some of these embodiments, discarding at least part of the stored context information is responsive to the second indication, which is received according to one of the following: included in or with the second message, or via broadcast in the target cell. In some of these embodiments, the second message includes an MR-DC configuration for the UE's connection with the wireless network In some embodiments, discarding at least part of the stored context information related to the UE's MR-DC includes discarding one or more of the following information from the stored context information:

- all of the stored context information;
- all lower-layer configurations related to the UE's MR-DC;
- all higher-layer configurations related to the UE's MR-DC;
- all of the configuration associated with the SN;
- configurations associated with one or more SN packet data convergence protocol (PDCP) entities;
- configurations associated with one or more SN-terminated bearers;
- configurations associated with one or more SN-terminated master cell group (MCG) bearers; and
- configurations associated with one or more SN-terminated secondary cell group (SCG) bearers.

In some of these embodiments, discarding at least part of the stored context information is responsive to one of the first and second indications, which indicates the information to be discarded from the stored context information.

Other embodiments include methods (e.g., procedures) for a first network node configured to operate as a MN for a UE's MR-DC with a wireless network.

These exemplary methods can include storing store context information related to the UE's MR-DC. The first network node's stored context information includes a configuration associated with a SN for the UE's MR-DC. These exemplary methods can also include sending, to the UE, a message instructing the UE to release MR-DC and suspend the UE's connection with the wireless network. These exemplary methods can also include updating the first network node's stored context information related to the UE's MR-DC in response to releasing the MR-DC and suspending the UE's connection with the wireless network, including discarding at least part of the configuration associated with the SN. These exemplary methods can also include sending the updated context information related to the UE's MR-DC to a second network node that is a target node for resuming the UE's connection with the wireless network.

In some embodiments, the message includes a first indication for the UE to update stored context information related to the UE's MR-DC, including discarding at least part of the UE's configuration associated with the SN. In some of these embodiments, the first indication indicates whether the UE should discard one or more of the following information from the UE's stored context information related to the UE's MR-DC:

- all of the UE's context information related to the UE's MR-DC;
- all lower-layer configurations related to the UE's MR-DC;
- all higher-layer configurations related to the UE's MR-DC;
- all of the UE's configuration associated with the SN;
- configurations associated with one or more SN PDCP entities;
- configurations associated with one or more SN-terminated bearers;
- configurations associated with one or more SN-terminated MCG bearers; and
- configurations associated with one or more SN-terminated SCG bearers.

In some of these embodiments, updating the stored context information is performed by the network node in accordance with the first indication sent to the UE.

In other embodiments, updating the stored context information includes adding, to the (first network node's) stored context information, a third indication of whether the UE has discarded one or more of the following from the UE's stored context information related to the UE's MR-DC:

- all of the UE's context information related to the UE's MR-DC;
- all lower-layer configurations related to the UE's MR-DC;
- all higher-layer configurations related to the UE's MR-DC;
- all of the UE's configuration associated with the SN;
- configurations associated with one or more SN PDCP entities;
- configurations associated with one or more SN-terminated bearers;
- configurations associated with one or more SN-terminated MCG bearers; and
- configurations associated with one or more SN-terminated SCG bearers.

In some of these embodiments, updating the stored context information is performed by the first network node in accordance with the third indication added to the updated context information sent to the second network node. In other words, the first network node updates its stored context information, sent to the second network node, to match updates made by the UE to its stored context information.

In some embodiments, the message is an RR(Release message. In other embodiments, the message is an RRCReconfiguration message. In some of these embodiments, these exemplary methods can also include receiving a responsive RRCReconfigurationComplete from the UE only when the first network node did not send an RRCRelease message to the UE within a duration (e.g., UE timer period) after sending the RR(Reconfiguration message. In other of these embodiments, the RR(Reconfiguration message is sent with an RRCRelease message in a single MAC-layer PDU.

Other embodiments include methods (e.g., procedures) for a second network node configured to operate as a target node for resuming a UE's connection with a wireless network.

These exemplary methods can include receiving from the UE a request to resume the UE's connection with the wireless network in a target cell served by the second network node. The UE was in MR-DC with the wireless network before the UE's connection with the wireless network was suspended. These exemplary methods can also include receiving context information related to the UE's MR-DC from a first network node configured as a MN for the UE's MR-DC. The received context information excludes at least part of a configuration associated with the SN. These exemplary methods can also include, based on the received context information, sending to the UE a message instructing the UE to resume the UE's connection with the wireless network. The message includes one or more of the following:

- an MR-DC configuration for the UE's connection with the wireless network, and
- a second indication of whether the UE should discard at least part of the configuration associated with the SN from the UE's stored context information related to the MR-DC.

In some embodiments, the received context information includes a third indication of whether the UE has discarded at least part of the configuration associated with the SN from the UE's stored context information related to the MR-DC.

In some of these embodiments, the received context information has been updated by the first network node in accordance with the third indication. In other of these embodiments, these exemplary methods also include updating the received context information in accordance with the third indication (e.g., for alignment with the UE's stored context information).

In some of these embodiments, the third indication indicates whether the UE has discarded one or more of the various information from the UE's stored context information related to the UE's MR-DC, such as summarized above in relation to the first network node embodiments.

In some of these embodiments, the second message includes the second indication and these exemplary methods also include, based on the third indication, determining a misalignment (e.g., mismatch) between one or more parts of the received context information and corresponding one or more parts of the UE's stored context information related to the UE's MR-DC, and determining the second indication based on the determined misalignment. For example, the second indication can indicate that the UE should discard one or more of various information from the UE's stored context information related to the UE's MR-DC, such as summarized above for UE embodiments.

In other embodiments, the message includes the MR-DC configuration but does not include the second indication. Also, these exemplary methods also include broadcasting, in the target cell, an indication of whether each UE that attempts to resume a connection with the wireless network in the target cell, should discard one or more of the following information from the UE's stored context information related to MR-DC:

- all of the UE's stored context information related to MR-DC;
- all lower-layer configurations related to MR-DC;
- all higher-layer configurations related to MR-DC;
- all of the UE's configuration associated with the SN;
- configurations associated with one or more SN PDCP entities;
- configurations associated with one or more SN-terminated bearers;
- configurations associated with one or more SN-terminated MCG bearers; and
- configurations associated with one or more SN-terminated SCG bearers.

Other embodiments include UEs (e.g., wireless devices, IoT devices, etc. or component(s) thereof) and network nodes (e.g., base stations, eNBs, gNBs, ng-eNBs, etc., or components thereof) configured to perform operations corresponding to any of the exemplary methods described herein. Other embodiments include non-transitory, computer-readable media storing program instructions that, when executed by processing circuitry, configure such UEs or network nodes to perform operations corresponding to any of the exemplary methods described herein.

These and other embodiments described herein can reduce, eliminate, and/or mitigate network/UE misalignments when a UE in RRC_CONNECTED state is configured with MR-DC (particularly SN-terminated bearers) and an MR-DC release is triggered by the MN. This may occur, for example, when the UE is suspended to RRC_INACTIVE state. Embodiments can address this potential misalignment by making the network aware of whether the SN-terminated bearers and the PDCP entity at the SN are released or not by the UE during the MR-DC release procedure. Accordingly, this can avoid problematic context mismatches when the UE resumes the suspended connection, which improves both UE and network performance.

These and other objects, features, and advantages of embodiments of the present disclosure will become apparent upon reading the following Detailed Description in view of the Drawings briefly described below.

BRIEF DESCRIPTION OF THE DRAWINGS

FIG. 1 shows a high-level view of an exemplary LTE network architecture.

FIG. 2 shows an exemplary LTE control plane (CP) protocol stack.

FIGS. 3-4 illustrate various aspects of LTE dual connectivity (DC).

FIG. 5 shows a high-level view of an exemplary 5G/NR network architecture.

FIGS. 15-16 show ASN.1 data structures for exemplary RRCRelease messages, according to various embodiments of the present disclosure.

DETAILED DESCRIPTION

Figures 1, 2, 3:
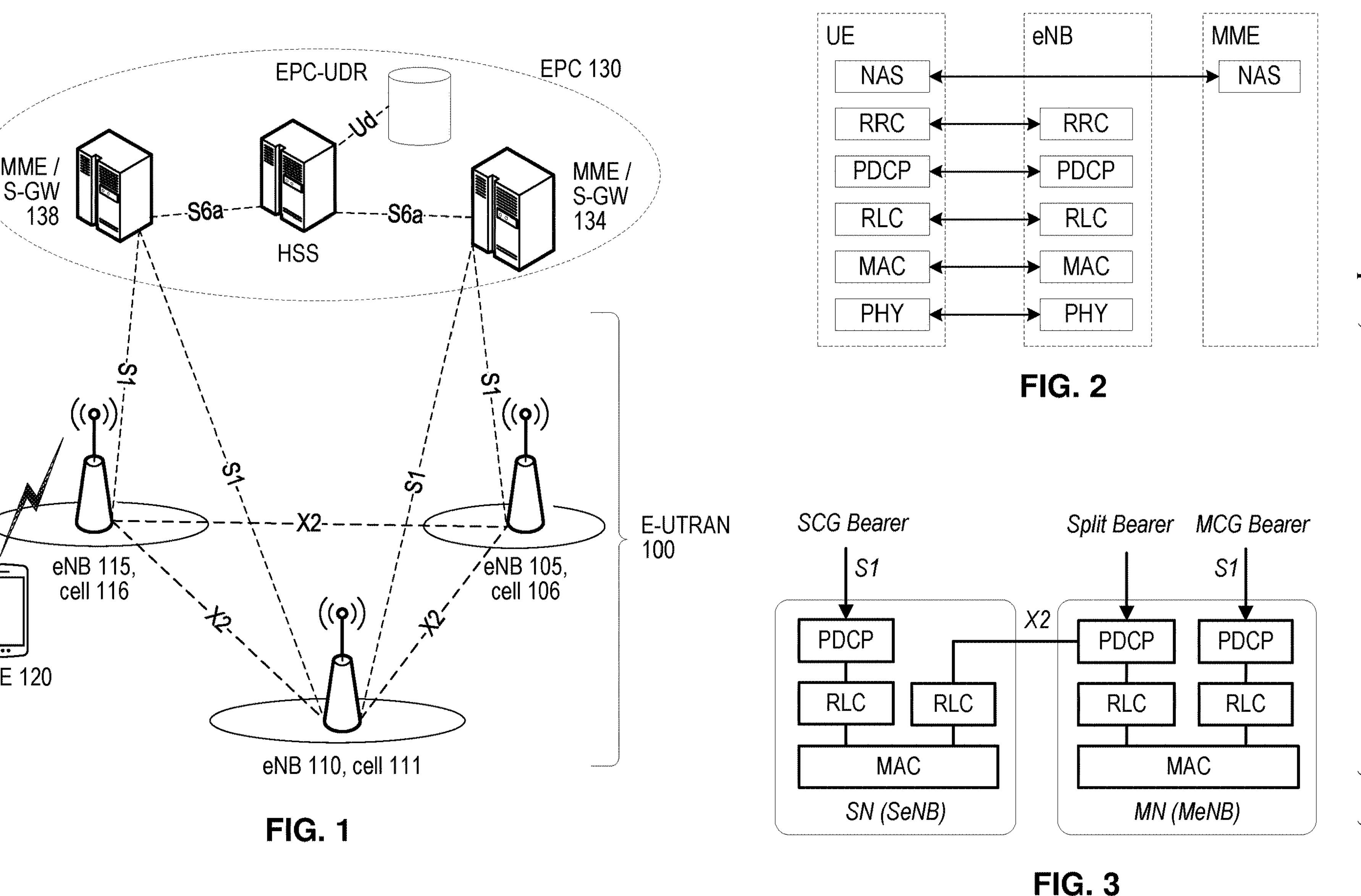

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB/en-gNB) in a 3GPP Fifth Generation (5G) NR network or an enhanced or evolved Node B (eNB/ng-eNB) in a 3GPP LTE network), base station distributed components (e.g., CU and DU), base station control- and/or user-plane components (e.g., CU-CP, CU-UP), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VOIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. Unless otherwise noted, the term "wireless device" is used interchangeably herein with the term "user equipment" (or "UE" for short).

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, there are various problems, difficulties, and/or issues with the handling at MR-DC release of SN-terminated bearers whose PDCP entity is hosted at the SN. This is discussed in more detail after the following description of various DC-related aspects.

In LTE, logical channel communications between a UE and an eNB are via radio bearers. Since LTE Rel-8, signaling radio bearers (SRBs) SRB0, SRB1, and SRB2 have been available for the transport of CP data (e.g., RRC and NAS messages). SRB0 is used for RRC connection setup, RRC connection resume, and RRC connection re-establishment. Once any of these operations has succeeded, SRB1 is used for handling RRC messages (which may include a piggybacked NAS message) and for NAS messages prior to establishment of SRB2. SRB2 is used for NAS messages and lower-priority RRC messages (e.g., logged measurement information). SRB0 and SRB1 are also used for establishment and modification of data radio bearers (DRBs) for carrying UP data between the UE and eNB. SRBs and DRBs are also used in NR, as discussed in more detail below.

In DC, the UE is configured with a Master Cell Group (MCG) associated with the MN and a Secondary Cell Group (SCG) associated with the SN. Each of the CGs is a group of serving cells that includes one MAC entity, a set of logical channels with associated RLC entities, a primary cell (PCell), and optionally one or more secondary cells (SCells). The term "Special Cell" (or "SpCell" for short) refers to the PCell of the MCG or the PSCell of the SCG depending on whether the UE's MAC entity is associated with the MCG or the SCG, respectively. In non-DC operation (e.g., CA), SpCell refers to the PCell. An SpCell is always activated and supports physical uplink control channel (PUCCH) transmission and contention-based random access by UEs.

The MN provides system information (SI) and terminates the control plane connection towards the UE and, as such, is the controlling node of the UE, including handovers to and from SNs. In LTE DC, for example, the MN terminates the connection between the eNB and the Mobility Management Entity (MME) for the UE. An SN provides additional radio resources (e.g., bearers) for radio resource bearers include MCG bearers, SCG bearers, and split bearers that have resources from both MCG and SCG. The reconfiguration, addition, and removal of SCells can be performed by RRC. When adding a new SCell, dedicated RRC signaling is used to send the UE all required SI of the SCell, such that UEs need not acquire SI directly from the SCell broadcast. It is also possible to support CA in either or both of MCG and SCG. In other words, either or both the MCG and the SCG can include multiple cells working in CA.

FIG. 3 shows an aggregated user plane (UP) protocol stack for LTE DC, while FIG. 4A shows the inter-eNB connectivity for the LTE DC UP. The UP aggregation shown in FIG. 3 achieves benefits such as increasing the throughput for users with good channel conditions and the capability of receiving and transmitting at higher data rates than can be supported by a single node, even without a low-latency backhaul connection between MeNB/MN and SeNB/SN.

As shown in FIG. 3, the LTE DC UP includes three different types of bearers. MCG bearers are terminated in the MN, and the S1-U connection for the corresponding bearer (s) to the S-GW is terminated in the MN (shown in FIG. 4A). The SN is not involved in the transport of UP data for MCG bearers. Likewise, SCG bearers are terminated in the SN, which can be directly connected with the S-GW via S1-U (as shown in FIG. 4A). The MN is not involved in the transport of UP data for SCG bearers. An S1-U connection between S-GW and SN is only present if SCG bearers are configured. Finally, split bearers are also terminated in the MN, with PDCP data being transferred between MN and SN via X2-U interface (shown in FIG. 4A). Both SN and MN are involved in transmitting data for split bearers.

FIG. 4B shows the inter-eNB CP connectivity for LTE DC. In this arrangement, all MME signaling is carried over the MeNB's S1-MME interface to the MME, with the SeNB's signaling also carried over the X2-C interface with the MeNB. The network's RRC connection with the UE is handled only by the MeNB, such that SRBs are always configured as MCG bearer type and only use radio resources of the MeNB. However, the MeNB can also configure the UE based on input from the SeNB and, in this manner, the SeNB can indirectly control the UE.

FIG. 5 illustrates a high-level view of a 5G network architecture, consisting of a Next Generation RAN (NG-RAN) 599 and a 5G Core (5GC) 598. NG-RAN 599 can include a set of gNodeB's (gNBs) connected to the 5GC via one or more NG interfaces, such as gNBs 500, 550 connected via interfaces 502, 552, respectively. In addition, the gNBs can be connected to each other via one or more Xn interfaces, such as Xn interface 540 between gNBs 500 and 550. With respect the NR interface to UEs, each of the gNBs can support frequency division duplexing (FDD), time division duplexing (TDD), or a combination thereof.

NG-RAN 599 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport.

The NG RAN logical nodes shown in FIG. 5 include a central (or centralized) unit (CU or gNB-CU) and one or more distributed (or decentralized) units (DU or gNB-DU). For example, gNB 500 includes gNB-CU 510 and gNB-DUs 520 and 530. CUs (e.g., gNB-CU 510) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUS and DUs can include various circuitry needed to perform their respective functions, including processing circuitry, transceiver circuitry (e.g., for communication), and power supply circuitry.

A gNB-CU connects to gNB-DUs over respective F1 logical interfaces, such as interfaces 522 and 532 shown in FIG. 5. The gNB-CU and connected gNB-DUs are only visible to other gNBs and the 5GC as a gNB. In other words, the F1 interface is not visible beyond gNB-CU. In the gNB split CU-DU architecture illustrated by FIG. 4, DC can be achieved by allowing a UE to connect to multiple DUs served by the same CU or by allowing a UE to connect to multiple DUs served by different CUs.

3GPP TR 38.804 (v14.0.0) describes the following DC scenarios or configurations:

- DC: LTE DC (i.e., both MN and SN employ LTE, as discussed above);
- EN-DC: LTE-NR DC where MN (eNB) employs LTE and SN (gNB) employs NR, and both are connected to EPC.
- NGEN-DC: LTE-NR dual connectivity where a UE is connected to one ng-eNB that acts as a MN and one gNB that acts as a SN. The ng-eNB is connected to the 5GC and the gNB is connected to the ng-eNB via the Xn interface.
- NE-DC: LTE-NR dual connectivity where a UE is connected to one gNB that acts as a MN and one ng-eNB that acts as a SN. The gNB is connected to 5GC and the ng-eNB is connected to the gNB via the Xn interface.
- NR-DC (or NR-NR DC): both MN and SN employ NR and connect to 5GC via NG.
- MR-DC (multi-RAT DC): a generalization of the Intra-E-UTRA DC described in 3GPP TS 36.300 (v16.0.0), where a multiple Rx/Tx UE may be configured to utilize resources provided by two different nodes connected via non-ideal backhaul, one providing E-UTRA access and the other one providing NR access. One node acts as the MN and the other as the SN, with one using LTE and the other using NR. The MN and SN are connected via a network interface and at least the MN is connected to the core network. EN-DC, NE-DC, and NGEN-DC are different example cases of MR-DC.

Figure 6:
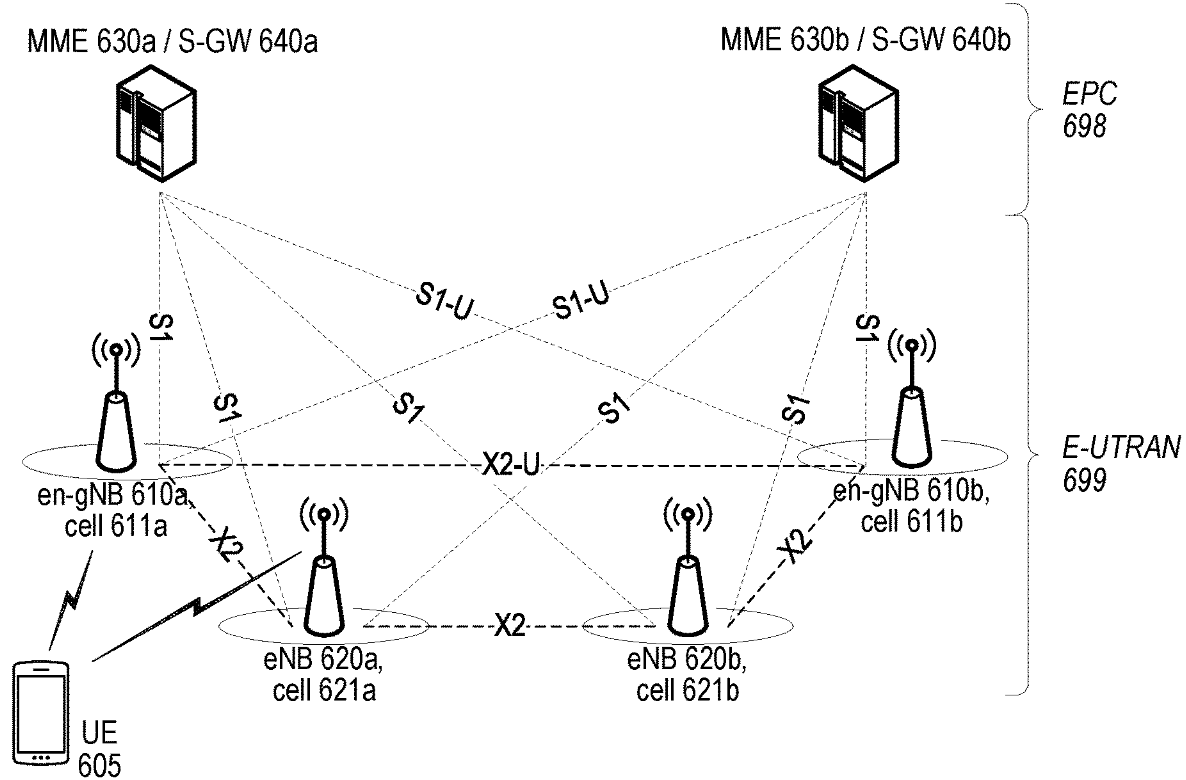
FIGS. 6-7 show high-level views of exemplary network architectures that support multi-RAT DC (MR-DC) using EPC and 5GC, respectively.

FIG. 6 shows a high-level view of an exemplary network architecture that supports EN-DC, including an E-UTRAN 699 and an EPC 698. As shown in the figure, E-UTRAN 699 can include en-gNBs (e.g., 610*a,b*) and eNBs (e.g., 620*a,b*) that are interconnected with each other via respective X2 (or X2-U) interfaces. The eNBs can be similar to those shown in FIG. 1, while the ng-eNBs can be similar to the gNBs shown in FIG. 5 except that they connect to EPC 698 via an S1-U interface rather than to a 5GC via an X2 interface. The eNBs also connect to EPC 698 via an S1 interface similar to the arrangement shown in FIG. 1. More specifically, en-gNBs (e.g., 610_a,b_) and eNBs (e.g., 620_a,b_) connect to MMEs (e.g., 630_a,b_) and S-GWs (e.g., 640_a,b_) in EPC 698.

Each of the en-gNBs and eNBs can serve a geographic coverage area including one more cells, including cells 611_a-b_ and 621_a-b_ shown as exemplary in FIG. 6. Depending on the particular cell in which it is located, a UE 605 can communicate with the en-gNB or eNB serving that particular cell via the NR or LTE radio interface, respectively. In addition, UE 605 can be in EN-DC connectivity with a first cell served by an eNB and a second cell served by an en-gNB, such as cells 620_a_ and 610_a_ shown in FIG. 6.

Figure 7:
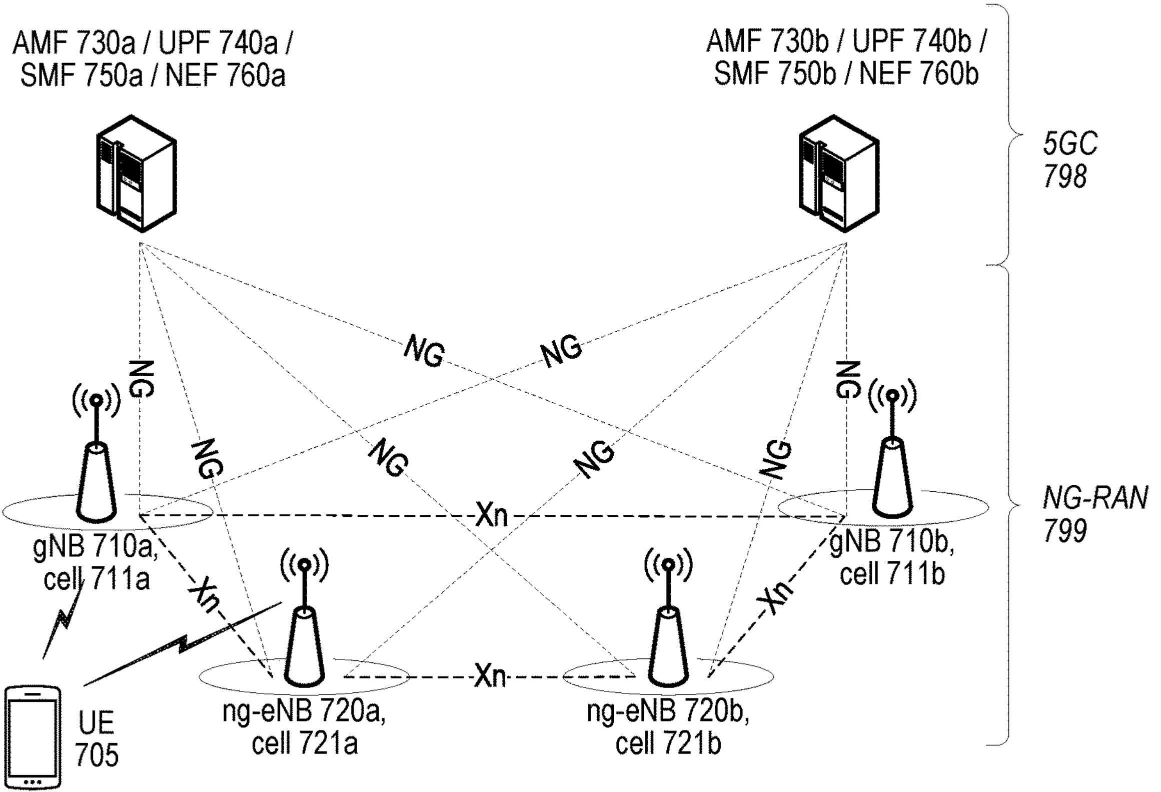

FIG. 7 shows a high-level view of an exemplary network architecture that supports MR-DC configurations based on a 5GC. More specifically, FIG. 7 shows an NG-RAN 799 and a 5GC 798. NG-RAN 799 can include gNBs (e.g., 710_a,b_) and ng-eNBs (e.g., 720_a,b_) that are interconnected with each other via respective Xn interfaces. The gNBs and ng-eNBs are also connected via the NG interfaces to 5GC 798, more specifically to Access and Mobility Management Functions (AMFs, e.g., 730_a,b_) via respective NG-C interfaces and to User Plane Functions (UPFs, e.g., 740_a,b_) via respective NG-U interfaces. Moreover, the AMFs can communicate with one or more Session Management Functions (SMFs, e.g., 750_a,b_) and Network Exposure Functions (NEFs, e.g., 760_a,b_).

Each of the gNBs 710 can be similar to those shown in FIG. 5, while each of the ng-eNBs 720 can be similar to the eNBs shown in FIG. 1 except that they connect to 5GC 798 via an NG interface rather than to EPC via an S1 interface. Each of the gNBs and ng-eNBs can serve a geographic coverage area including one more cells, including cells 711_a-b_ and 721_a-b_ shown as exemplary in FIG. 7. The gNBs and ng-eNBs can also use various directional beams to provide coverage in the respective cells. Depending on the particular cell in which it is located, a UE 705 can communicate with the gNB or ng-eNB serving that particular cell via the NR or LTE radio interface, respectively. In addition, UE 705 can be in MR-DC connectivity with a first cell served by an ng-eNB and a second cell served by a gNB, such as cells 720_a_ and 710_a_ shown in FIG. 7.

Figure 8:
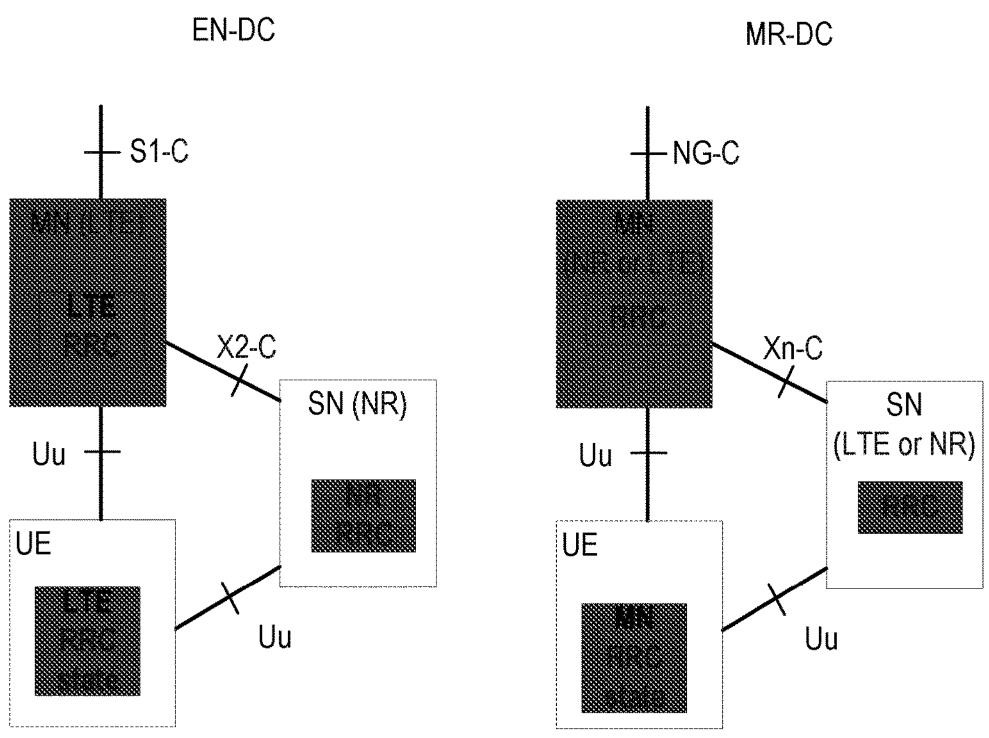
FIG. 8 shows a high-level comparison of CP architectures of two DC alternatives.

FIG. 8 is a block diagram showing a high-level comparison of CP architectures in EN-DC with EPC (e.g., FIG. 6) and MR-DC with 5GC (e.g., FIG. 7). The RATs used by MN and SN in these two architectures are shown in parentheses. In either case, the UE has a single RRC state based on MN RRC (LTE or NR) and a single CP connection to the CN via Uu interface to MN and S1-C or NG-C interface to CN. RRC PDUs generated by the SN can be transported via the X2-C or Xn-C interface to the MN (as the case may be) and the Uu interface from MN to UE. The MN always sends the initial SN RRC configuration via MCG SRB (SRB1), but subsequent reconfigurations may be transported via MN or SN. When transporting RRC PDU from the SN, the MN does not modify the UE configuration provided by the SN.

As shown in FIG. 8, each of MN and SN has an RRC entity for creating RRC Information Elements (IEs) and messages for configuring the UE. Since the SN is responsible for its own resources, it provides the UE with the SCG configuration in an RRC message and also the radio bearer configuration in an IE, for all bearers that are terminated in the SN. The MN in turn creates the MCG configuration and the radio bearer configuration for all bearers terminated in the MN. The cell group configuration includes the configuration of L1 (physical layer), MAC and RLC. The radio bearer configuration includes the configuration of PDCP (and SDAP in case of 5GC).

Figure 9:
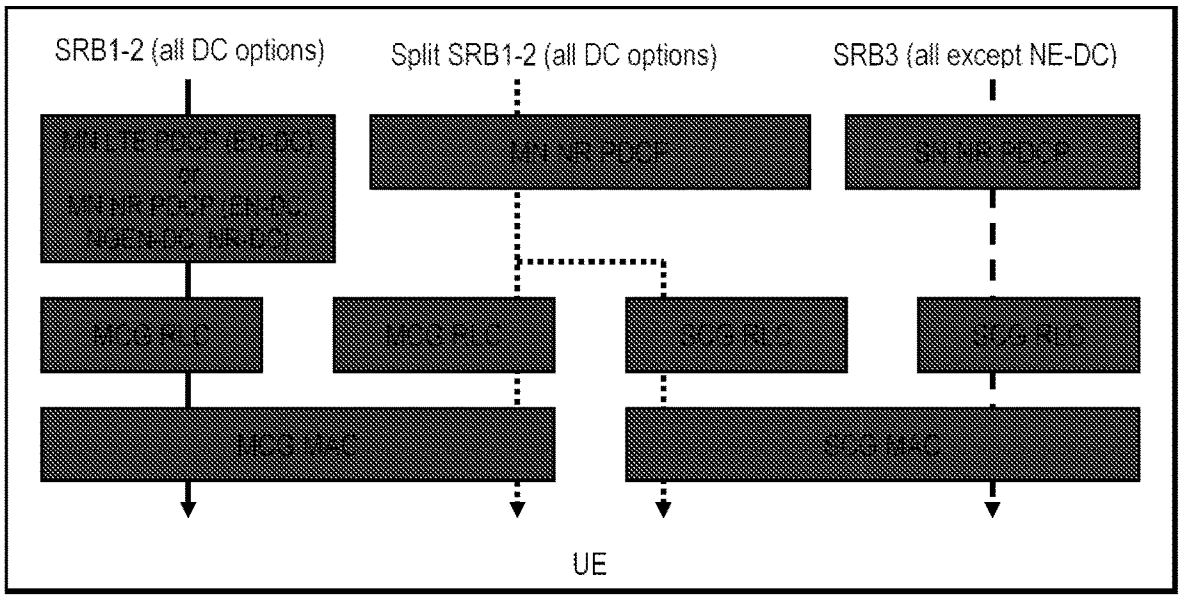
FIG. 9 shows exemplary network-side protocol termination options for signaling radio bearers (SRBs) in MR-DC.

FIG. 9 shows exemplary network-side protocol termination options for SRBs in MR-DC, including EN-DC with EPC. The MN sends the initial SN RRC configuration via MCG SRB (SRB1), but subsequent RRC configurations created by the SN can be sent to the UE either via the MN using SRB1 or directly to the UE using SRB3 (if configured) . For the SRB1 case, the MN receives from the SN an RRC message containing the SCG configuration and an IE containing the radio bearer configuration. The MN encapsulates these into the RRC message it creates itself, that may also include changes to the MCG configuration and radio bearer configuration of bearers terminated in the MN. Thereby, the MCG and SCG configurations may be sent to the UE in the same RRC message.

For E-UTRAN (e.g., eNB) connected to EPC, SRB1 uses E-UTRA PDCP at initial connection establishment. If the UE supports EN-DC (regardless of whether EN-DC is configured), after initial connection establishment the network can configure both MCG SRB1 and SRB2 to use either E-UTRA PDCP or NR PDCP. Change from E-UTRA PDCP to NR PDCP (or vice-versa) is supported via a handover procedure (e.g., reconfiguration with mobility) or, for the initial change of SRB1 from E-UTRA PDCP to NR PDCP, with a reconfiguration without mobility before the initial security activation.

If the SN is a gNB (i.e., for EN-DC, NGEN-DC, and NR-DC), the UE can be configured to establish SRB3 with the SN to enable RRC PDUs for the SN to be sent directly between the UE and the SN. RRC PDUs for the SN can only be transported directly to the UE for SN RRC reconfiguration not requiring any coordination with the MN. Measurement reporting for mobility within the SN can be done directly from the UE to the SN if SRB3 is configured.

Split SRB uses the NR PDCP layer and is supported for all MR-DC options, allowing duplication of RRC PDUs generated by the MN. For example, split SRB1 can be used to create diversity. From RRC point of view, it operates like normal SRB1 but on the PDCP layer, the sender can choose to send an RRC message via MN (MCG), via SN (SCG), or duplicated via MCG and SCG. In the DL, the path switching between MCG, SCG, or duplication is left to network implementation while the network configures UEs to use the MCG, SCG, or duplication in the UL. Subsequently, the terms "link", "leg", "path", and "RLC bearer" are used interchangeably to refer to UE-MN and UE-SN communications.

Figure 10:
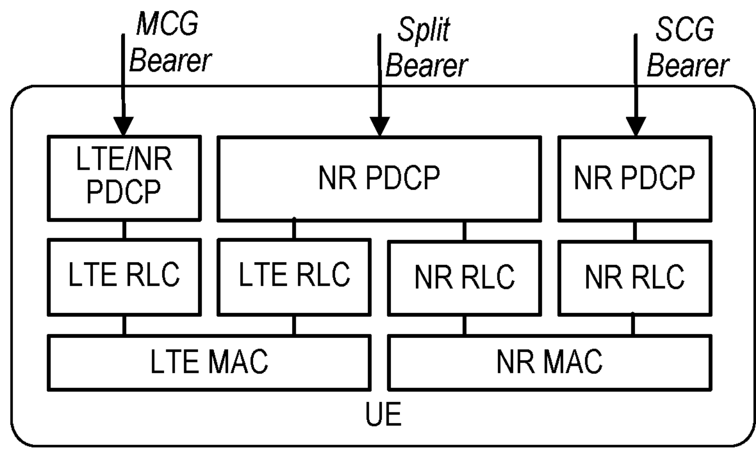
FIGS. 10-11 show UP protocol architectures from a UE perspective for EN-DC with EPC and MR-DC with 5GC, respectively.
Figure 11:
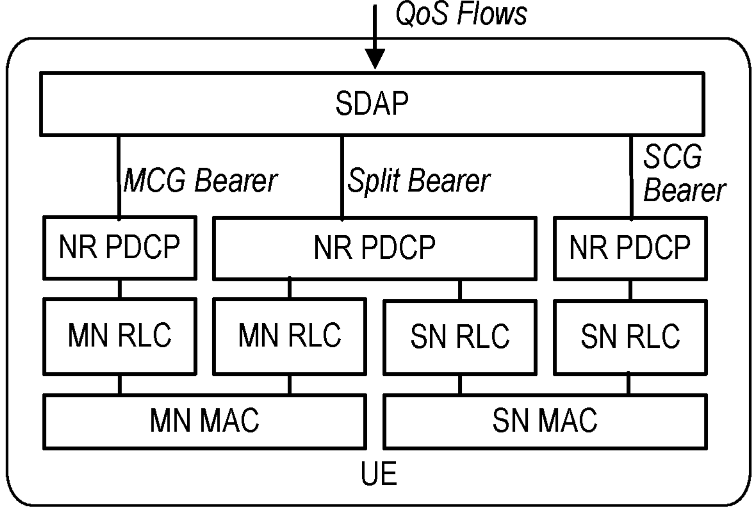

FIGS. 10-11 show UP radio protocol architectures from a UE perspective for MR-DC with EPC (e.g., EN-DC) and with 5GC (e.g., NGEN-DC, NE-DC), respectively. In both cases, a UE supports MCG, SCG, and split bearers, as discussed above. In the EN-DC arrangement shown in FIG. 10, MCG bearers have either LTE (e.g., E-UTRA) or NR PDCP and LTE RLC and MAC layers, while SCG bearers have NR PDCP, RLC, and MAC layers. Split bearers have NR PDCP layer and both LTE and NR RLC and MAC layers. In the arrangement shown in FIG. 11, all bearers have NR PDCP layers and lower layers corresponding to the RAT used by the MN and SN. One difference between the architectures in FIGS. 10-11 is that the various bearers for MR-DC with 5GC are associated with QoS flows that are terminated in an SDAP layer above PDCP.

Figure 12:
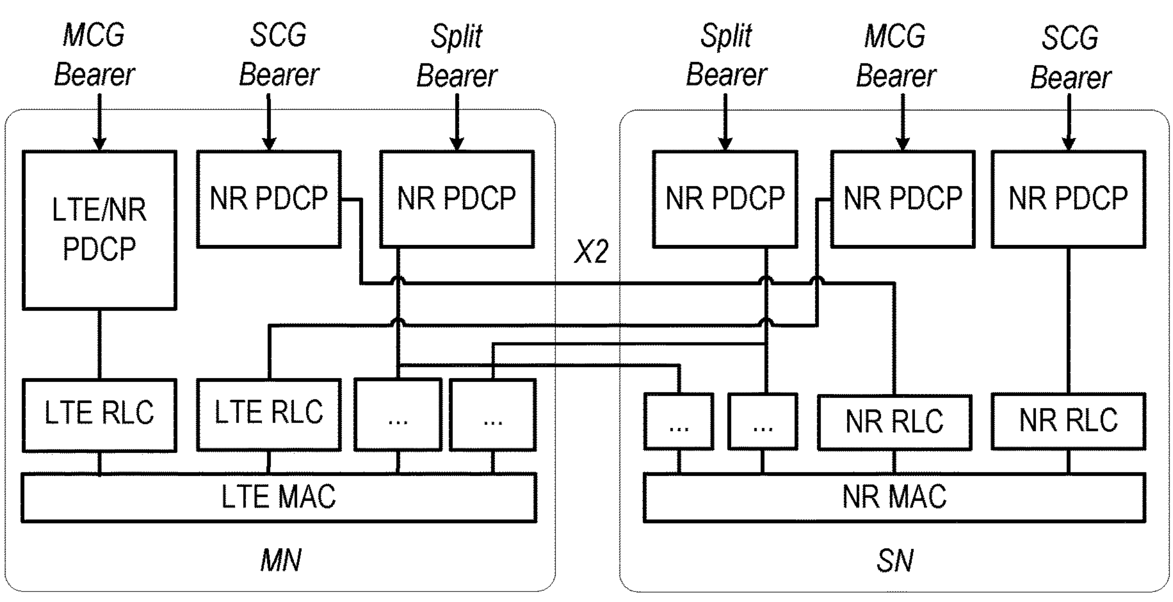
FIGS. 12-13 show UP radio protocol architectures from a network perspective for EN-DC with EPC and MR-DC with 5GC, respectively.
Figure 13:
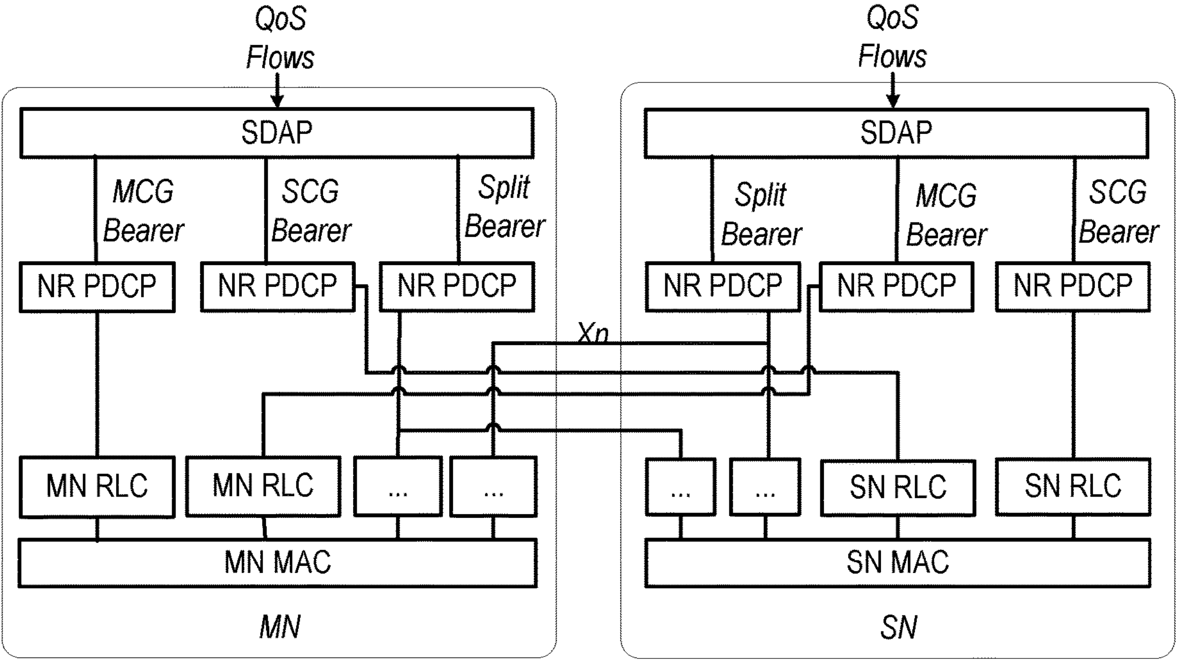

FIGS. 12-13 show UP radio protocol architectures from a network perspective for MR-DC with EPC (e.g., EN-DC) and with 5GC (e.g., NGEN-DC, NE-DC, and NR-DC), respectively. In the EN-DC arrangement shown in FIG. 12, an MCG bearer terminated in MN has PDCP layer of the RAT used by the MN, while all other bearers have NR PDCP layer. All bearers have lower layers associated with the RAT of the node(s) in which they are terminated.

In the arrangement shown in FIG. 13, all bearers have NR PDCP layers and lower layers associated with the RAT of the node(s) in which they are terminated. From a network perspective, each MCG, SCG, or and split bearer can be terminated either in MN or in SN. For example, the X2 or Xn interface between the nodes will carry traffic for SCG or split bearers terminated in MN PDCP layer to lower layers in SN. Likewise, X2 or Xn will carry traffic for MCG or split bearers terminated in SN PDCP layer to lower layers in MN. One difference between the architectures in FIGS. 12-13 is that the various bearers for MR-DC with 5GC are associated with QoS flows that are terminated in an SDAP layer above PDCP.

When a UE is in operating in MR-DC, the release of the UE's MR-DC can be initiated by the network. The following text from 3GPP TS 38.331 (v16.4.0) illustrates operations performed by the UE upon MR-DC release.

***Begin Text from 3GPP TS 38.331

5.3.5.10 MR-DC Release

The UE shall:

1> as a result of MR-DC release triggered by E-UTRA or NR:
  2> release SRB3, if established, as specified in 5.3.5.6.2;
  2> release measConfig associated with SCG;
  2> if the UE is configured with NR SCG:
    3> release the SCG configuration as specified in clause 5.3.5.4;
    3> release otherConfig associated with the SCG;
    3> stop timers T346a, T346b, T346c, T346d and T346e associated with the SCG, if running;
  2> else if the UE is configured with E-UTRA SCG:
    3> release the SCG configuration as specified in TS 36.331 [10], clause 5.3.10.19 to release the E-UTRA SCG;

*End Text from 3GPP TS 38.331*

According to Rel-15 RRC procedures, a UE that is released to RRC_IDLE or suspended to RRC_INACTIVE releases all its MR-DC configurations. This is modeled in RRC by the UE explicitly releasing MR-DC configurations upon resume initiation, as illustrated by the exemplary text from 3GPP TS 38.331 (v15.13.0) shown below. Ellipses denote text that has been omitted for brevity.

*Begin Text from 3GPP TS 38.331*

5.3.13 RRC Connection Resume 5.3.13.1 General

[ . . . ]

The purpose of this procedure is to resume a suspended RRC connection, including resuming SRB(s) and DRB(s) or perform an RNA update.

5.3.13.2 Initiation

The UE initiates the procedure when upper layers or AS (when responding to RAN paging or upon triggering RNA updates while the UE is in RRC_INACTIVE) requests the resume of a suspended RRC connection.

[ . . . ]

1> if the UE is in NE-DC or NR-DC:
  2> release the MR-DC related configurations (i.e., as specified in 5.3.5.10) from the UE Inactive AS context, if stored;

[ . . . ]

1> initiate transmission of the RRCResumeRequest message or RRCResumeRequest1 in accordance with 5.3.13.3

*End Text from 3GPP TS 38.331*

In Rel-16, a feature has been introduced to allow a UE to store MR-DC configurations in the UE AS inactive context, if the UE is capable of doing that. This is done so the target gNB can determine to resume MR-DC when it is resuming the RRC connection with the UE. This feature is illustrated by the exemplary text from 3GPP TS 38.331 (v16.4.0) shown below.

*Begin Text from 3GPP TS 38.331*

5.3.13 RRC Connection Resume 5.3.13.1 General

[ . . . ]

5.3.13.2 Initiation

[ . . . ]

1> if the UE is in NE-DC or NR-DC:
  2> if the UE does not support maintaining SCG configuration upon connection resumption:
    3> release the MR-DC related configurations (i.e., as specified in 5.3.5.10) from the UE Inactive AS context, if stored;

*End Text from 3GPP TS 38.331*

However, there can be some problems, difficulties, and/or issues with the handling of the SN-terminated bearers whose PDCP entity is hosted at the SN. For example, in EN-DC with a MeNB and an SgNB, there may be an SN-terminated bearer with an NR PDCP entity.

According to 3GPP TS 38.331 (v16.4.0) section 5.3.5.10, when performing the MR-DC release (mainly for the suspend/resume case), the UE basically releases the lower layers of the SCG configurations, the SCG measurement configuration(s), and SRB3 configuration. However, it is not specified how the UE handles the upper layers of the SN, including PDCP entity, configurations and state information for SN terminated bearers, etc.

This can result in various problems, issues, and/or difficulties. As a first example, there can be a misalignment between the versions of the UE AS inactive context stored at the network and at the UE. For instance, the network may store the SN-terminated bearers but the UE releases them (and thus doesn't store them in the AS inactive context). When resuming the UE's connection, the network may attempt delta configuration for continuing to use such bearers once that the UE transitions again to RRC_CONNECTED state. Since the UE has not stored these bearers in its inactive context, this may lead to a connection failure followed by a re-establishment and/or the release of the connectivity for the UE.

As a second example, the existing implementation framework requires significant signaling between MN and SN as well as between MN and UE. If a network wants to release the SN-terminated bearers before it suspends the UE, the serving gNB first needs to release the SN connection, and once it is confirmed, then send the UE an RRCReconfiguration message including an explicit indication of releasing the SN terminated bearers, and then receive an RRCReconfigurationComplete message from the UE. Only then can the serving gNB send the UE an RR(Release message with suspendConfig IE. In this framework, there are three messages between UE and the serving gNB, and two messages between serving gNB (operating as MN) and the SN.

In addition to suspend/resume (or resume initiation), there are also other use cases where MR-DC is released in which the MR-DC release procedure discussed in 3GPP TS 38.331 is used, including:

- Explicit reconfiguration (mrdc-SecondaryCellGroupConfig in RRCReconfiguration is set to release, or when mrdc-SecondaryCellGroupConfig includes mrdc-ReleaseAndAdd);
- Implicit release upon the triggering of a full configuration; and
- Implicit release upon the triggering of a re-establishment procedure.

These uses cases can encounter the same two issues as the suspend/resume discussed above.

Accordingly, embodiments of the present disclosure provide techniques for a network to release MR-DC higher layers configuration related to SN context for a UE in MR-DC, including PDCP configurations, state information such as counters, variables, keys, etc., SDAP configurations, etc. These techniques can involve operations at a UE and at a network node, particularly the MN (e.g., MgNB) serving the UE in RRC_CONNECTED state before the MR-DC release.

Embodiments can provide various benefits, advantages, and/or solutions to problems described herein. For example, embodiments can reduce, eliminate, and/or mitigate misalignment between the network and the UE when the UE in RRC_CONNECTED state is configured with MR-DC (particularly SN-terminated bearers) and an MR-DC release is triggered by the MN. This may occur for example when the UE is suspended to RRC_INACTIVE state. This can be accomplished by making the network aware of whether the SN-terminated bearers and the PDCP entity at the SN are released or not by the UE during the MR-DC release procedure.

At a high level, embodiments can include a UE performing one or more of the following operations:

- In response to releasing the MR-DC configuration, the UE also releases the SN-terminated bearer(s) and SN PDCP entity maintained at the UE.
- The UE receives an indication from the MN indicating whether the SN-terminated bearers and/or SN PDCP entity shall be kept (and stored in UE AS inactive context) or released (and not stored in UE AS inactive context) by the UE when transitioning to RRC_INACTIVE state.

Additionally, at a high level, embodiments can include a network node (e.g., UE's MN) performing one or more of the following operations:

- The MN triggers the release of the MR-DC configuration(s), including SN-terminated bearers and/or SN PDCP entity e SN. In other words, the UE's MN in MR-DC does not store the MR-DC configuration(s) in the UE AS Inactive context but instead triggers a release of MR-DC towards the UE's SN (e.g., by transmitting an SN Release Request). Upon reception the SN releases the MR-DC configurations, including the PDCP entities and/or SN-terminated bearer configuration(s).
- Upon suspending the UE, the network node (UE's former MN) includes in its UE AS inactive context (or any other form of UE context stored when the UE is suspended) an indication of SN-terminated bearer(s) the UE shall store in its AS inactive context, or alternatively an indication of what configuration(s) the UE shall release (and not store in the UE's AS inactive context). When the network node receives a request for the stored context from the UE's target network node for resuming the connection, the network node provides the target network node with the stored UE AS inactive context including the particular indication. This will help the target network node (which may be a different than the network node) understand whether to keep or release that specific MR-DC configuration. Notice that this also comprises two possible sub-solutions:
  - In one option, the network node, upon suspending the UE, releases the context at the SN, as it knows that the UE is also going to delete upon resume.
  - In another option, the network node does not release the context at the SN upon suspending the UE, but rather requests the SN to release MR-DC configuration (e.g., SN-terminated bearer configuration) after context fetching for resume, if the context includes the indication that the UE has deleted (or is going to delete before resuming the connection) the SN-terminated bearer configuration(s).
- The network node explicitly releases the SN-terminated bearer configuration(s) before it suspends the UE, e.g., by sending an RRCReconfiguration message. The network node can also release the SN-terminated bearer configuration(s) at the SN (network implementation).

Embodiments of the present disclosure will now be described in more detail, specifically in the context of NR. Even so, the underlying concepts can be applied equally to LTE or any other RAT or RAN, such as a 6G system that may implement Multi-Radio Dual Connectivity (MR-DC) or Multi-Radio Multi-Connectivity functionality. Further, embodiments are applicable to any of the MR-DC options described herein.

In the following description, the term "bearer" can correspond to a data radio bearer (DRB), signaling radio bearer (SRB), or radio bearer (RB).

In general, embodiments are applicable to the scenario where a UE configured with MR-DC is suspended to RRC_INACTIVE and has SN-terminated bearers configured or has other higher-layer MR-DC configurations for the SN (except SCG configuration and SRB3 configuration). For example, "higher layer MR-DC configuration" can include SN PDCP entity and its configuration, SDPA configurations, etc. while "lower layer MR-DC configuration" can include SN PHY, MAC, RLC entity, etc. For example, if SN uses the split CU-DU architecture described above, higher-layer configurations can refer to SN CU configurations and lower-layer configurations can refer to SN DU configurations.

Furthermore, although embodiments are described generally in the context of SN-terminated bearers, the underlying principles are applicable for any configuration that is not autonomously released by the UE when the UE transitions to RRC_INACTIVE state, but that the network does not want to maintain while the UE is in RRC_INACTIVE state, and/or does not want to release when the UE resumes to RRC_CONNECTED state. The network can release this configuration upon suspending and only indicate the release to the UE upon resume.

In some embodiments, when the UE performs an MR-DC release procedure (e.g., as specified in 3GPP TS 38.331 section 5.3.5.10), the UE releases both the higher layer MR-DC configurations and the lower layer MR-DC configurations. This includes releasing all PDCP entities for the SN-terminated bearer(s) previously configured at the UE for MR-DC purposes. This can include releasing DRBs terminated at the SN and configured with NR PDCP configuration if the UE is in EN-DC, or configured with LTE PDCP configuration if the UE is in NR-DC. The following exemplary text illustrates how such embodiments can be specified in 3GPP TS 38.331 (v16.4.0), with unrelated portions being omitted as indicated by ellipsis.

*Begin Exemplary Text for 3GPP TS 38.331*

5.3.5.10 MR-DC Release

The UE shall:

1> as a result of MR-DC release triggered by E-UTRA or NR:

[ . . . ]

2> release SN-terminated bearer(s) and the related PDCP entity, if established;

[ . . . ]

*End Exemplary Text for 3GPP TS 38.331*

In a variant of these embodiments, when the UE performs an MR-DC release procedure (e.g., as specified in 3GPP TS 38.331 section 5.3.5.10), the UE releases the SN terminated bearer(s) configured in a radioBearerConfig2 field by the network node. The radioBearerConfig2 field is used for UEs supporting NR-DC or NE-DC to configure radio bearers (DRBs, SRBs) including SDAP/PDCP for SN-terminated bearers. One advantage of these embodiments is that UE releases the SN-terminated bearers but can retain the MN-terminated bearers for later usage, e.g., for resuming the connection. The following exemplary text illustrates how such embodiments can be specified in 3GPP TS 38.331 (v16.4.0), with unrelated portions being omitted as indicated by ellipsis.

*Begin Exemplary Text for 3GPP TS 38.331*

5.3.5.10 MR-DC Release

The UE shall:

1> as a result of MR-DC release triggered by E-UTRA or NR:

[ . . . ]

2> release configurations in radioBearerConfig or radioBearerConfig2;

[ . . . ]

*End Exemplary Text for 3GPP TS 38.331*

In another variant of these embodiments, the UE releases the SN terminated bearers when the UE performs the MR-DC release triggered by a specific procedure, such as when the UE initiates resume and/or when the UE is suspended. One advantage of this approach is that in some cases where MR-DC is released, SN-terminated bearers are clearly stored in the UE AS context and the network may want them to remain stored, such as for when the UE performs re-establishment. The following exemplary text illustrates how selective release upon resume initiation can be specified in 3GPP TS 38.331 (v16.4.0), with unrelated portions being omitted as indicated by ellipsis.

*Begin Exemplary Text for 3GPP TS 38.331*

5.3.5.10 MR-DC Release

The UE shall:

1> as a result of MR-DC release triggered by E-UTRA or NR:

[ . . . ]

2> if the procedure is triggered upon resume initiation, release configurations in radioBearerConfig or radioBearerConfig2;

[ . . . ]

*End Exemplary Text for 3GPP TS 38.331*

In some embodiments, when the UE performs the MR-DC release procedure the UE releases a PDCP entity that have been previously indicated to be released. For example, the UE may have received an indication (e.g., during configuration) that a particular bearer is an SN-terminated bearer to be released upon MR-DC release. Alternately, the UE may have received a more generic indication to release one or more specific bearers upon MR-DC release.

In some embodiments, when the UE performs the MR-DC release procedure the UE releases the PDCP entity for a bearer (e.g., DRB) being released and, if an SDAP entity associated with this bearer is configured, the UE indicates the release of the bearer to the SDAP entity associated with the released bearer. Further details about SDAP entities are given in 3GPP TS 37.324 (v16.3.0) section 5.3.3.

In these embodiments, the network node (i.e., operating as the UE's MN in MR-DC) assumes that the UE is going to release the MR-DC configuration including higher layer configurations such as SN PDCP entity configuration for SN-terminated bearers. As such, the network can release the corresponding MR-DC configurations upon suspending the UE or can rely on the target network node for UE resume to do this.

The network node (i.e., operating as the UE's MN in MR-DC) triggers the release of the MR-DC configuration(s), such as SN-terminated bearers and the PDCP entity on the SN. In other words, the network node does not store the MR-DC configuration(s) in the UE AS Inactive context and triggers a release of MR-DC towards the UE's SN for MR-DC. This can be done, for example, by sending an SN Release Request message. Upon receiving this message, the SN releases the MR-DC configurations, including the PDCP entities and/or SN-terminated bearer configuration(s).

Figure 14:
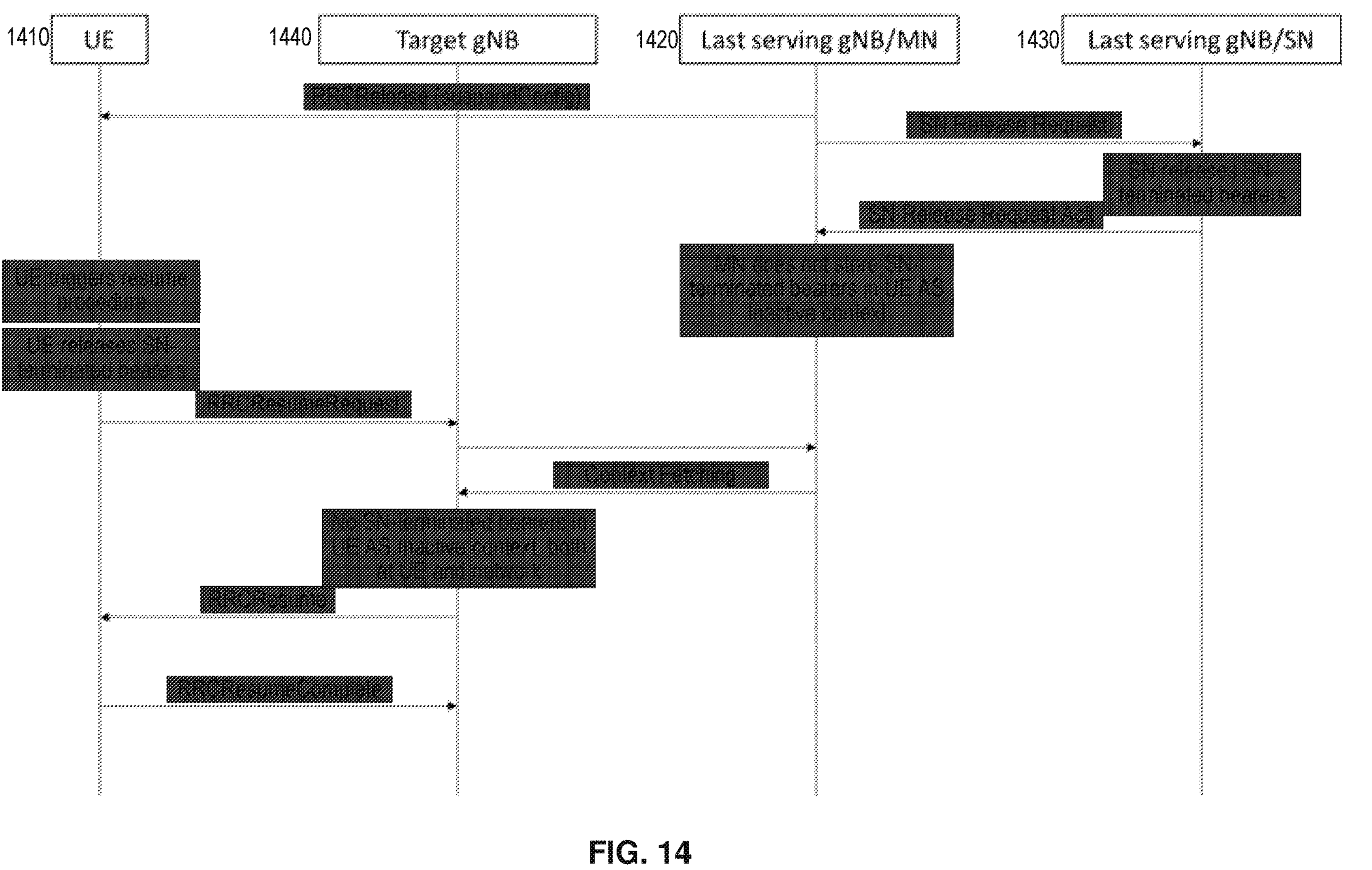
FIG. 14 shows an exemplary signaling flow between a UE, the UE's MN and SN prior to suspend, and the UE's target node for resume, according to various embodiments of the present disclosure.

FIG. 14 shows an exemplary signaling flow between a UE (1410), the UE's MN (1420) and SN (1430) prior to suspension, and the target gNB (1440) for the UE's resume, according to the embodiments described above. These reference numbers will also be used to refer to these respective entities in several other figures described below.

In other embodiments, when the network node (i.e., operating as the UE's MN in MR-DC) sends an RRCRelease (with suspend configuration) message to suspend the UE to RRC_INACTIVE state, the network node includes an indication for the UE to release all MR-DC configurations and not store such information in the UE AS inactive context. Upon receiving this indication, the UE enters RRC_INACTIVE and releases MR-DC configuration(s), including explicitly the release of SN-terminated bearers.

FIG. 15 shows an ASN.1 data structure for an exemplary RRCRelease message according to these embodiments. This message includes an mrdc-SecondaryCellGroupConfig field set to 'release'. Upon reception of this exemplary RRCRelease message, the UE releases MR-DC based on the field value and enters RRC_INACTIVE state. The following exemplary text illustrates how such procedures can be specified in 3GPP TS 38.331 (v16.4.0), with particularly relevant portions being underlined and unrelated portions being omitted by ellipsis.

*Begin Exemplary Text for 3GPP TS 38.331*

5.3.8.3 Reception of the RRCRelease by the UE

The UE shall:

[ . . . ]

1> if the RRCRelease includes suspendConfig:

2> apply the received suspendConfig;

2> if mrdc-SecondaryCellGroupConfig is set to release:

3> perform MR-DC release as specified in clause 5.3.5.10;

[ . . . ]

2> if the RRCRelease message with suspendConfig was received in response to an RRCResumeRequest or an RRCResumeRequest1:

[ . . . ]

2> else:

3> store in the UE Inactive AS Context the current $K_{gNB}$ and $K_{RRCint}$ keys, the ROHC state, the stored QoS flow to DRB mapping rules, the C-RNTI used in the source PCell, the cellIdentity and the physical cell identity of the source PCell, the spCellConfigCommon within Reconfiguration-WithSync of the NR PSCell (if configured) and all other parameters configured except for:

parameters within ReconfigurationWithSync of the PCell;

parameters within ReconfigurationWithSync of the NR PSCell, if configured;

parameters within MobilityControlInfoSCG of the E-UTRA PSCell, if configured;

servingCellConfigCommonSIB;

[ . . . ]

2> enter RRC_INACTIVE and perform cell selection as specified in TS 38.304 [20];

[ . . . ]

*End Exemplary Text for 3GPP TS 38.331*

In other embodiments the indication to release SN-terminated bearers is a drb-ToReleaseList field or, equivalently, a DRB-ToReleaseList information element (UE). FIG. 16 shows an ASN.1 data structure for an exemplary RRCRelease message according to these embodiments. This message includes a drb-ToReleaseList field defined to be of the DRB-ToReleaseList. Upon reception of this exemplary RRCRelease message, the UE releases the SN-terminated bearers indicated by the field value and enters RRC_INACTIVE state. In a variant of FIG. 16, the parameter drb-ToReleaseList can be included in a series of nested IEs, such as RadioBearerConfig.

The following exemplary text illustrates how such procedures can be specified in 3GPP TS 38.331 (v16.4.0), with particularly relevant portions being underlined and unrelated portions being omitted by ellipsis.

*Begin Exemplary Text for 3GPP TS 38.331*

5.3.8.3 Reception of the RRCRelease by the UE

The UE shall:

[ . . . ]

1> if the RRCRelease includes suspendConfig:

2> apply the received suspendConfig;

2> for each drb-Identity value included in the drb-ToReleaseList that is part of the current UE configuration:

3> release the PDCP entity and the drb-Identity;

3> if SDAP entity associated with this DRB is configured;

4> indicate the release of the DRB to SDAP entity associated with this DRB (TS 37.324 [24], clause 5.3.3);

3> if the DRB is associated with an eps-BearerIdentity:

4> if a new bearer is not added either with NR or E-UTRA with same eps-BearerIdentity:

5> indicate the release of the DRB and the eps-BearerIdentity of the released DRB to upper layers.

[ . . . ]

2> if the RRCRelease message with suspendConfig was received in response to an RRCResumeRequest or an RRCResumeRequest1:

[ . . . ]

2> else:

3> store in the UE Inactive AS Context the current $K_{gNB}$ and $K_{RRCint}$ keys, the ROHC state, the stored QoS flow to DRB mapping rules, the C-RNTI used in the source PCell, the cellIdentity and the physical cell identity of the source PCell, the spCellConfigCommon within Reconfiguration-WithSync of the NR PSCell (if configured) and all other parameters configured except for:

parameters within ReconfigurationWithSync of the PCell;

parameters within ReconfigurationWithSync of the NR PSCell, if configured;

parameters within MobilityControlInfoSCG of the E-UTRA PSCell, if configured;

servingCellConfigCommonSIB;

[ . . . ]

2> enter RRC_INACTIVE and perform cell selection as specified in TS 38.304 [20];

[ . . . ]

*End Exemplary Text for 3GPP TS 38.331*

In other embodiments, the indication may simply indicate to release the entire MR-DC configurations including PHY, MAC, RLC, and PDCP at the SN. This indication can be a single bit with “0” indicating that the MR-DC configuration should be released (and not stored in the UE AS inactive context) and “1” indicating that the MR-DC configuration should not be released (and stored in the UE AS inactive context). These values can also have the opposite meanings, if desired. Alternatively, this indication can be a Boolean field with the value “true” indicating that the MR-DC configuration should be released (and not stored in the UE AS inactive context) and “false” indicating that the MR-DC configuration should not be released (and stored in the UE AS inactive context). These two values can also be given opposite meanings, if desired.

As another alternative, the presence or absence of the field in the RRCRelease message can indicate whether or not the MR-DC configuration should be released. In more general terms, the indication for storing/not releasing the MR-DC configuration (comprising the SN-terminated bearer configuration) may be the presence of one or more fields or parameters in the RRCRelease message while the indication for releasing/not storing the MR-DC configuration may be the absence of the one or more fields or parameters in the RR(Release message.

In other embodiments, the indication can have more than two values such that the network can explicitly indicate to the UE particular portions of an MR-DC configuration to release. For example, the indication can have values representing one or more of the following requested UE operations:

Release MR-DC lower layer configurations and not store them in the UE AS Inactive context (e.g., PHY, MAC, RLC);

Release MR-DC higher layer configuration and not store them in the UE AS Inactive context (e.g., PDCP);

Release all the SN-terminated bearers (and not store any bearer configuration in the UE AS Inactive context);

Release only the SN-terminated SCG bearers (and not store any SCG bearer configuration in the UE AS Inactive context); and Release only the SN-terminated MCG bearers (and not store any MCG bearer configuration in the UE AS Inactive context).

In other embodiments, the indication for releasing MR-DC (or for keeping stored) may be included in a System Information Block (SIB) message that is broadcast by a target network node in a target cell where the UE is camping and may attempt to resume the connection. In that case, upon initiating a resume procedure and upon receiving the indication, the UE releases the MR-DC configuration as described above. This can include releasing of SN-terminated bearers that may be stored by the UE while the UE is trying to resume to RRC_CONNECTED state.

Note that these embodiments where the target node broadcasts an indication can be complementary to other embodiments described above where the UE's MN in MR-DC sends the indication via unicast to the UE. For example, the network node (i.e., UE's MN in MR-DC) assumes that the UE is going to release the MR-DC configuration including higher layer configurations such as SN PDCP entity configuration for SN-terminated bearers. As such, the network node can release the corresponding MR-DC configurations upon suspending the UE (e.g., via the indication) or can rely on the target network node for UE resume to do this (e.g., via broadcast of the indication).

The network node (i.e., UE's MN in MR-DC) triggers release of the MR-DC configuration(s), such as SN-terminated bearers and the SN PDCP entity. In other words, the network node does not store the MR-DC configuration(s) in the UE AS Inactive context and triggers a release of MR-DC towards the UE's SN for MR-DC. This can be done, for example, by sending an SN Release Request message. Upon receiving this message, the SN releases the MR-DC configurations, including the PDCP entities and/or SN-terminated bearer configuration(s).

Figure 17:
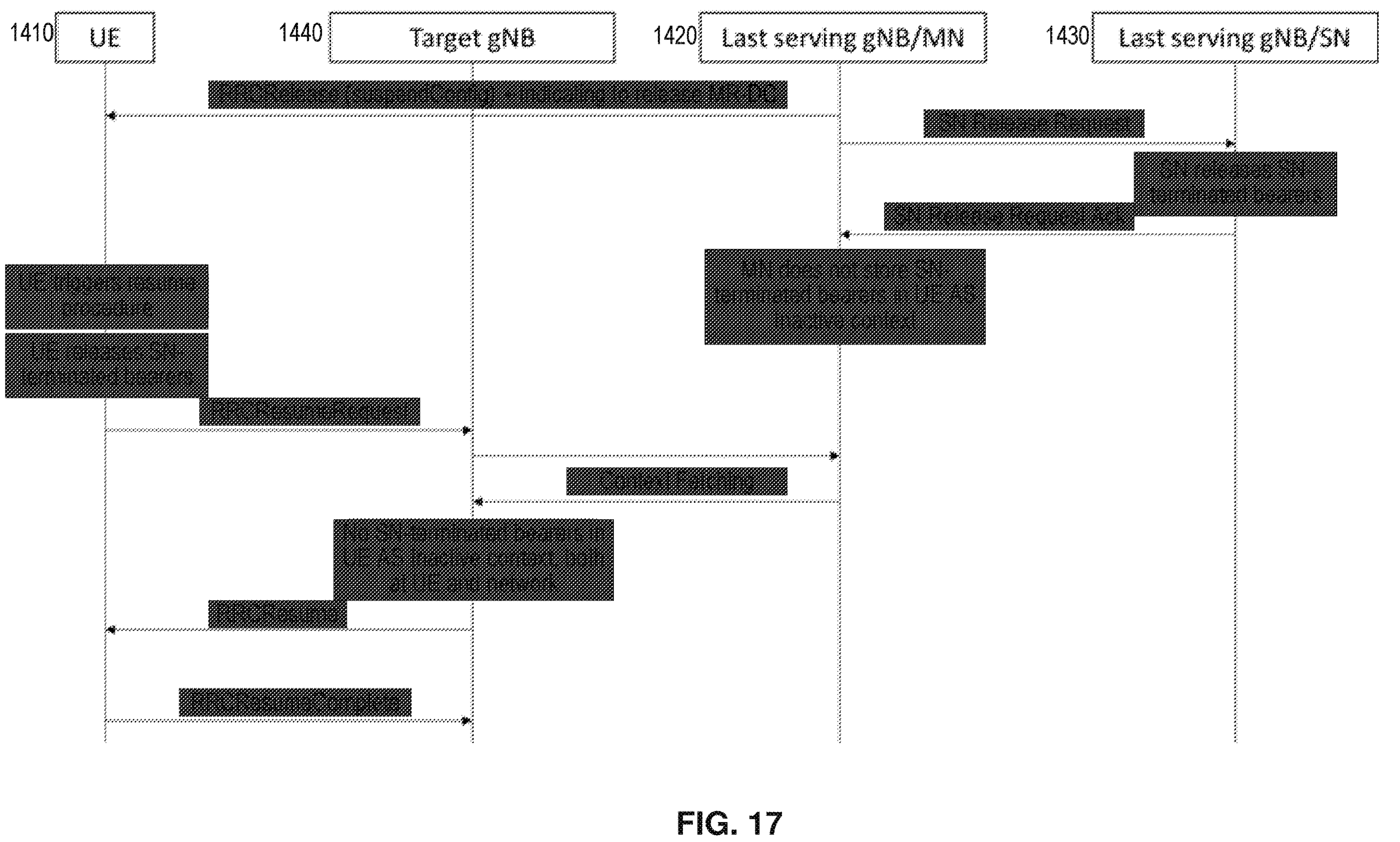
FIGS. 17-20 show various exemplary signaling flows between a UE, the UE's MN and SN prior to suspend, and the UE's target node for resume, according to various embodiments of the present disclosure.

FIG. 17 shows an exemplary signaling flow between a UE (1410), the UE's MN (1420) and SN (1430) prior to suspension, and the target gNB (1440) for the UE's resume, according to the embodiments described above. In a variant of the above-described embodiments, the indication is received with the RRCRelease message rather than within the RR(Release message, as discussed above.

In some embodiments, the indication is explicit signaling for releasing MR-DC that is included in an RRCReconfiguration message (defined in 3GPP TS 38.331). The UE releases MR-DC configurations upon receiving an RRCReconfiguration message including the indication.

In some embodiments, if the indication is the only content of the RRCReconfiguration message, the UE does not have to transmit a responsive RRCReconfigurationComplete message to the network because the UE is waiting for an RRCRelease message shortly from the network.

In other embodiments, UE initiates a timer upon receiving an RR(Reconfiguration message including the indication and releases the MR-DC configurations. While the timer is running the UE does not have to transmit a responsive RRCReconfigurationComplete message to the network. If the UE receives the expected RRCRelease message while the timer is running, the UE stops the timer and perform actions responsive to the RRCRelease message. If the timer expires, the UE transmits the RRCReconfigurationComplete message in response to the RRCReconfiguration message.

Figure 18:
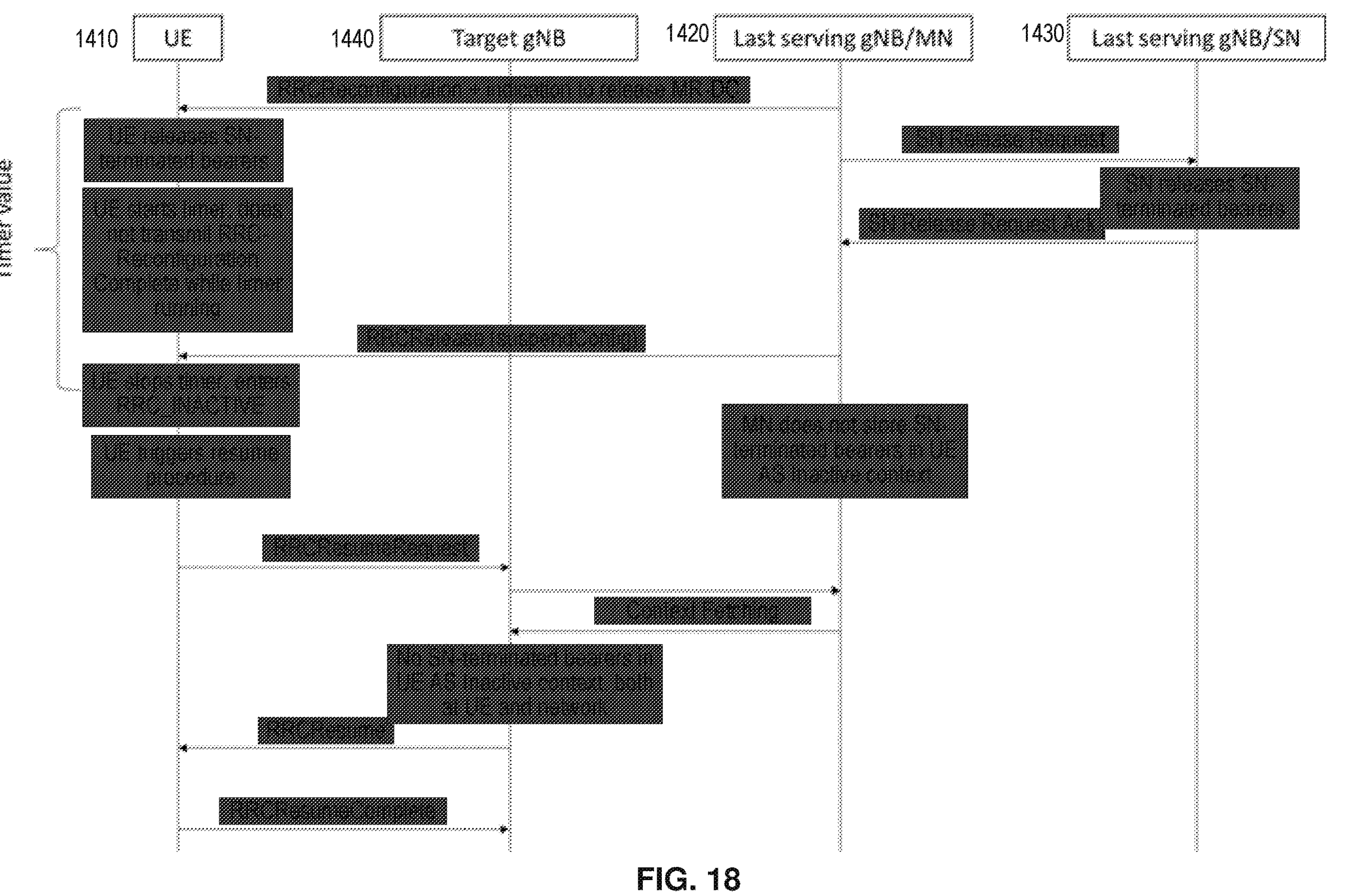
Figure 19:
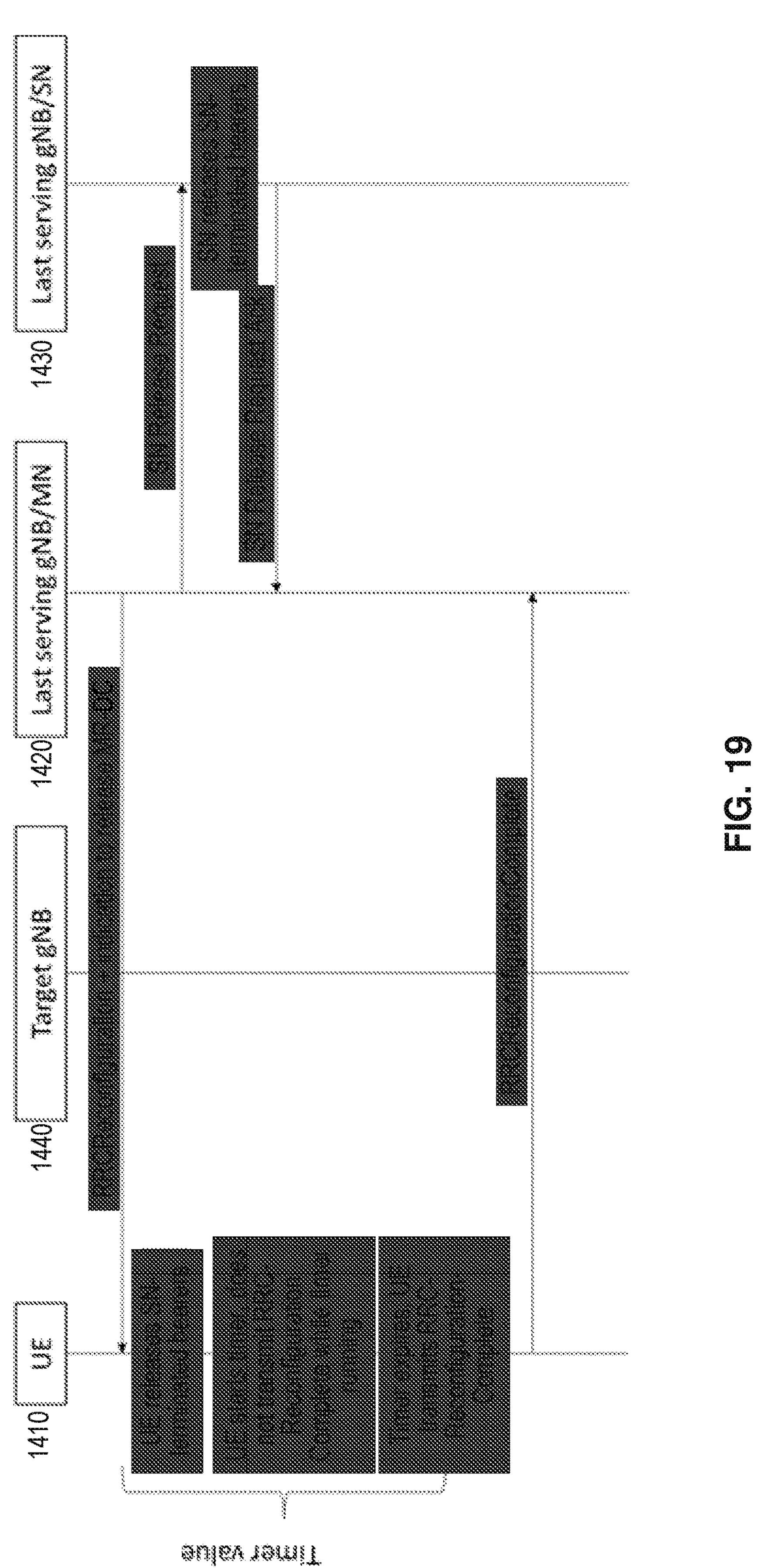

FIGS. 18-19 show two exemplary signaling flows between a UE (1410), the UE's MN (1420) and SN (1430) prior to suspension, and the target gNB (1440) for the UE's resume, according to the embodiments described above. In particular, FIG. 18 shows the case where the UE receives an RR(Release while the timer is still running, while FIG. 19 shows the case where the timer expires without the UE receiving the RR(Release message.

In other embodiments, the indication is explicit signaling for releasing MR-DC that is included in an RRCReconfiguration message, which can be combined with an RRCRelease message in a single MAC-layer protocol data unit (PDU). The UE releases MR-DC configurations upon receiving the RRCReconfiguration message including the indication. Because the RRC Reconfiguration message is received in the same MAC PDU as the RRCRelease message, the UE does not transmit a responsive RRCReconfigurationComplete message to the network.

In other embodiments, the network node (i.e., operating as the UE's MN in MR-DC) releases the MR-DC configuration and does not store it in the network node's UE AS Inactive context. Additionally, the network node includes an indication in the network's stored UE AS Inactive context (or any form of context information for that UE) that the UE may still have MR-DC configurations stored in its AS Inactive Context, which may need to be released during a resume procedure.

Subsequently, the target network node for the UE's resume attempt fetches the UE AS Inactive context from the network node (previously operating as the UE's MN in MR-DC) and determines that it includes no MR-DC configurations (which were released) but that the UE may have stored (rather than released) MR-DC configurations in its AS Inactive context. In response, the target network node generates an RR(Resume message including a release of any MR-DC configuration(s) stored at the UE (e.g., SN-terminated bearers).

Figure 20:
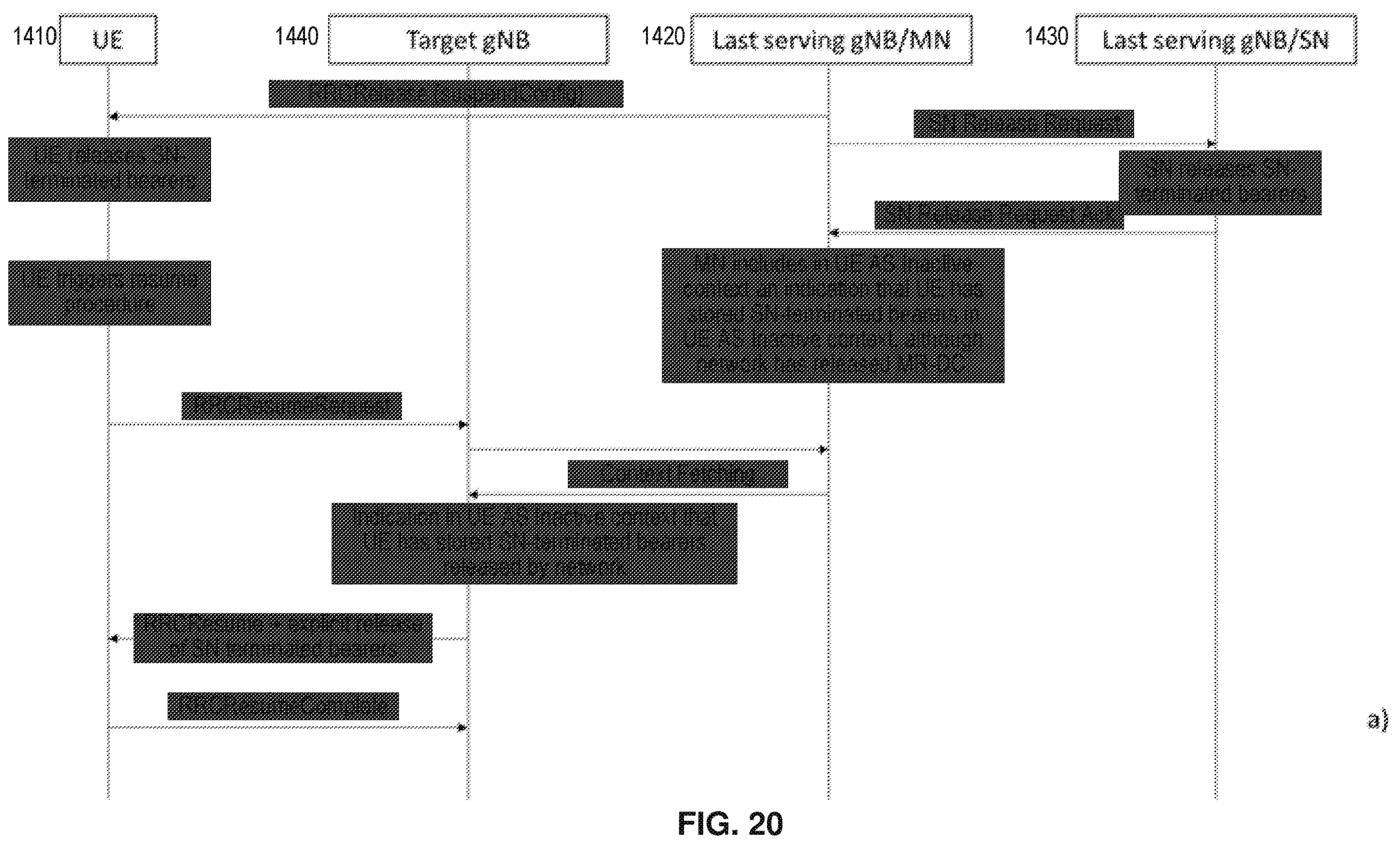

FIG. 20 shows an exemplary signaling flow between a UE (1410), the UE's MN (1420) and SN (1430) prior to suspension, and the target gNB (1440) for the UE's resume, according to the embodiments described above.

In some of these embodiments, the indication may be a single bit with "0" value indicating that the MR-DC configuration is stored in the UE-side AS Inactive context and "1" value indicating that the MR-DC configuration is not stored in the UE-side AS Inactive context (or vice versa). Alternatively, the indication can be a Boolean field with "true" value indicating that the MR-DC configuration is stored in the UE-side AS Inactive context and "false" value indicating that the MR-DC configuration is not stored in the UE-side AS Inactive context (or vice versa). As another alternative, the presence or absence of the indication in a message (e.g., RR(Release) can indicate whether or not the MR-DC configuration is stored in the UE-side AS Inactive context.

In other embodiments, the indication can have more than two values such that the network can explicitly indicate whether or not particular portions of the MR-DC configuration is stored in the UE-side AS Inactive context. For example, the indication can have values representing one or more of the following:

- The UE has stored the MR-DC lower layer configurations in the UE AS Inactive context on the UE-side (e.g., PHY, MAC, RLC)
- The UE has stored the MR-DC higher layer configurations in the UE AS Inactive context on the UE-side (e.g., PDCP)
- The UE has stored the SN-terminated bearers (and bearer configuration) in the UE AS Inactive context on the UE-side.
- The UE has stored only the SN-terminated SCG bearers (and SCG bearer configurations) in the UE AS Inactive context on the UE-side.
- The UE has stored only the SN-terminated MCG bearers (and MCG bearer configurations) in the UE AS Inactive context on the UE-side.

In other embodiments, when the UE resumes toward a target network node that is different than the network node that previously was the UE's MN in MR-DC, the target network node fetches the UE context from the network node. After checking the presence and/or value of the indication in accordance with any of the above-described embodiments, the target network node can perform at least one of the following operations:

- Include an MR-DC configuration in the RRCResume message but without an indication (i.e., restoreSCG flag) to restore the SCG configurations that the UE stored in the AS inactive context. This can be implemented by an RRCResume message that includes an RRC Reconfiguration message for setting up an MR-DC configuration but does not include the restoreSCG flag.
- Refrain from including any MR-DC configuration in the RRCResume message, such that neither an RRCReconfiguration message and nor a restoreSCG flag is present in the RRCResume message. Upon receiving this RRCResume message, the UE deletes stored MR-DC related configuration when the UE deletes its stored UE AS inactive context (i.e., during the resume procedure).

In some embodiments, the network node that was previously the UE's MN in MR-DC can send an indication according to any of the above-described embodiments to the target network node via inter-node (e.g., X2, Xn) interface signaling or via inter-node RRC messages.

In some embodiments, when the UE resumes toward a target network node that is different than the network node previously operating as the UE's MN in MR-DC, the target network node fetches the UE context from the network node and performs security key update based on the master security key for all bearers.

In some embodiments, when the target network node receives the resume request and fetches the context, it determines that the UE is not capable of storing the MR-DC configuration (e.g., Rel-15 UE). Based on that determination, the target network node explicitly indicates to the UE that the UE shall release MR-DC configurations, e.g., release/removal of SN-terminated bearers and the SN PDCP entity. This can be done, for example, by removing from the UE AS Inactive context the bearers that have an ID that were previously configured by radioBearerConfig (or radioBearerConfig2). The target network node knows it needs to release these bearer when radioBearerConfig (or radioBearerConfig2) is in the UE AS Inactive context retrieved from the network node.

In these embodiments, the target network node assumes that certain actions are performed at the network node previously operating as the UE's MN in MR-DC. In some embodiments, upon (or before) suspending the UE to RRC_INACTIVE state, the network node releases all the MR-DC configurations towards the SN (triggering SN Release towards SN) but keeps the radioBearerConfig (or radioBearerConfig2, depending on which was used) stored in its own UE AS Inactive context. Based on fetching this context, the target network node knows whether it needs to explicitly release the SN-terminated bearer and the SN PDCP entity.

In some embodiments, when the target network node receives the resume request and fetches the context, it determines that the UE is capable of storing the MR-DC configuration (e.g., Rel-16 UE). Even so, the target network node explicitly indicates to the UE that the UE shall release MR-DC configurations, e.g., release/removal of SN-terminated bearers and the SN PDCP entity. As discussed above, this can be done by removing from the UE AS Inactive context the bearers that have an ID that were previously configured by radioBearerConfig (or radioBearerConfig2). The target network node knows it needs to release these bearer when radioBearerConfig (or radioBearerConfig2) is in the UE AS Inactive context retrieved from the network node.

If the UE is capable of storing MR-DC configurations in UE AS Inactive context, in addition to the previous actions, the target network node includes an indication to also release the MR-DC lower layer configurations (in addition to the release of SN-terminated bearers and the PDCP entity at the SN). However, for doing this, the network node needs to indicate to the target network node that it has deleted all the MR-DC configurations from its own UE AS Inactive context but that the UE still has stored them in its own UE AS Inactive context.

Figure 21:
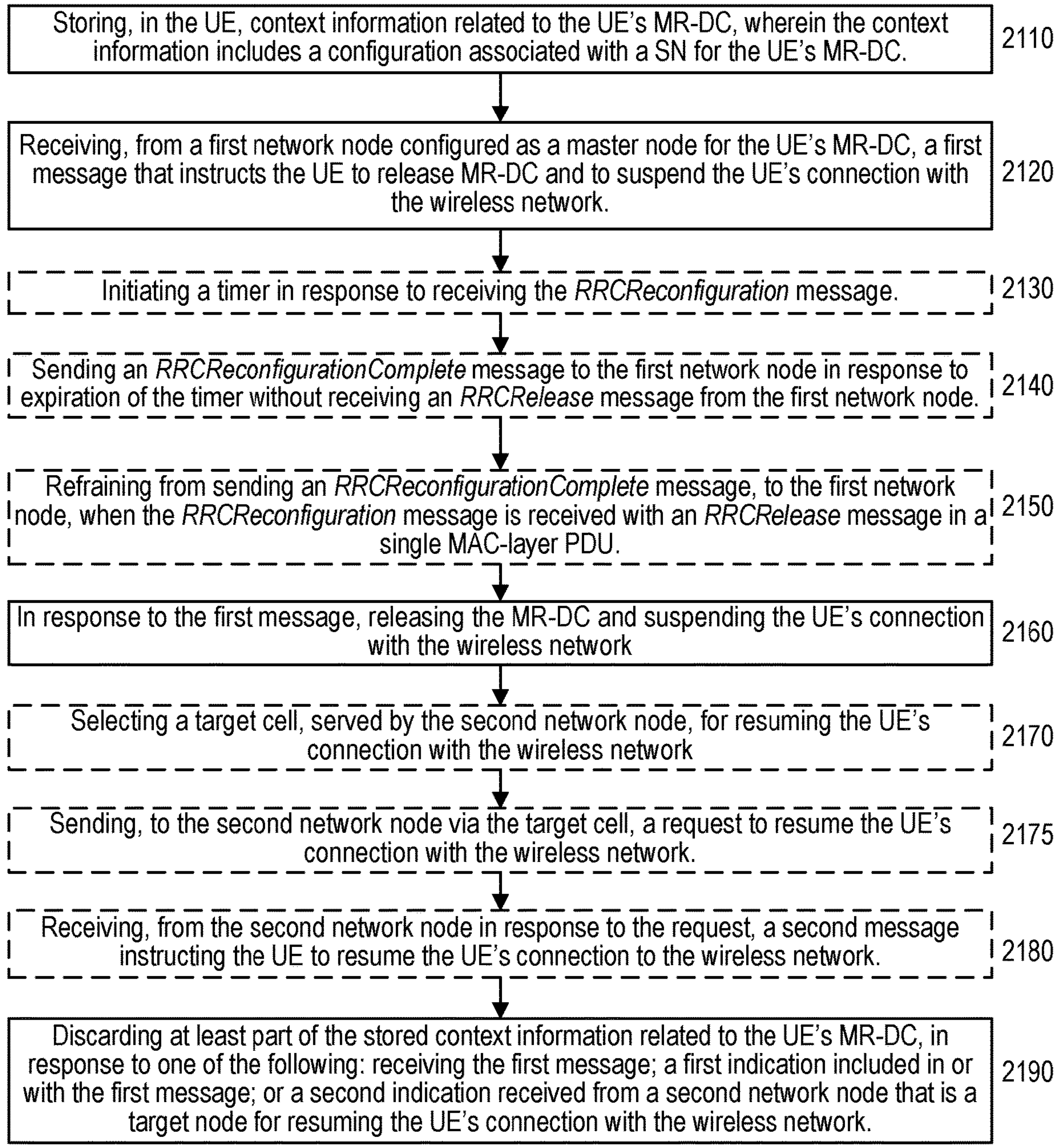
FIG. 21 is a flow diagram of an exemplary method (e.g., procedure) for a UE, according to various embodiments of the present disclosure.
Figure 22:
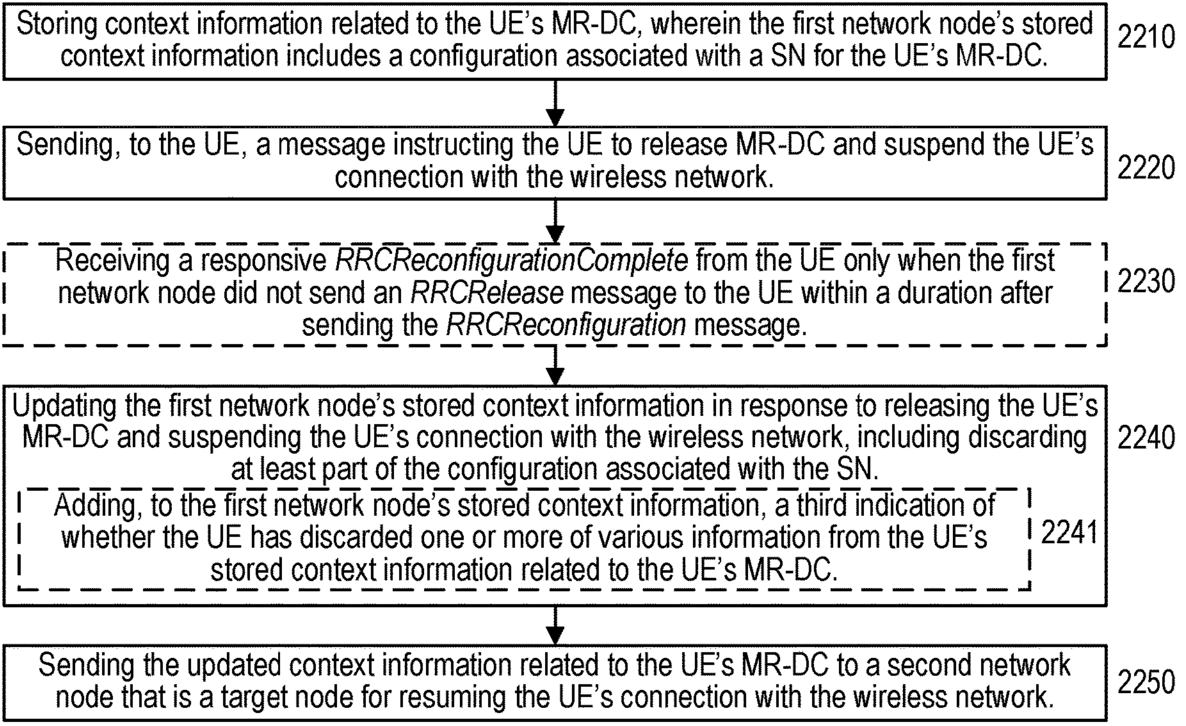
FIG. 22 is a flow diagram of an exemplary method (e.g., procedure) for a first network node, according to various embodiments of the present disclosure.
Figure 23:
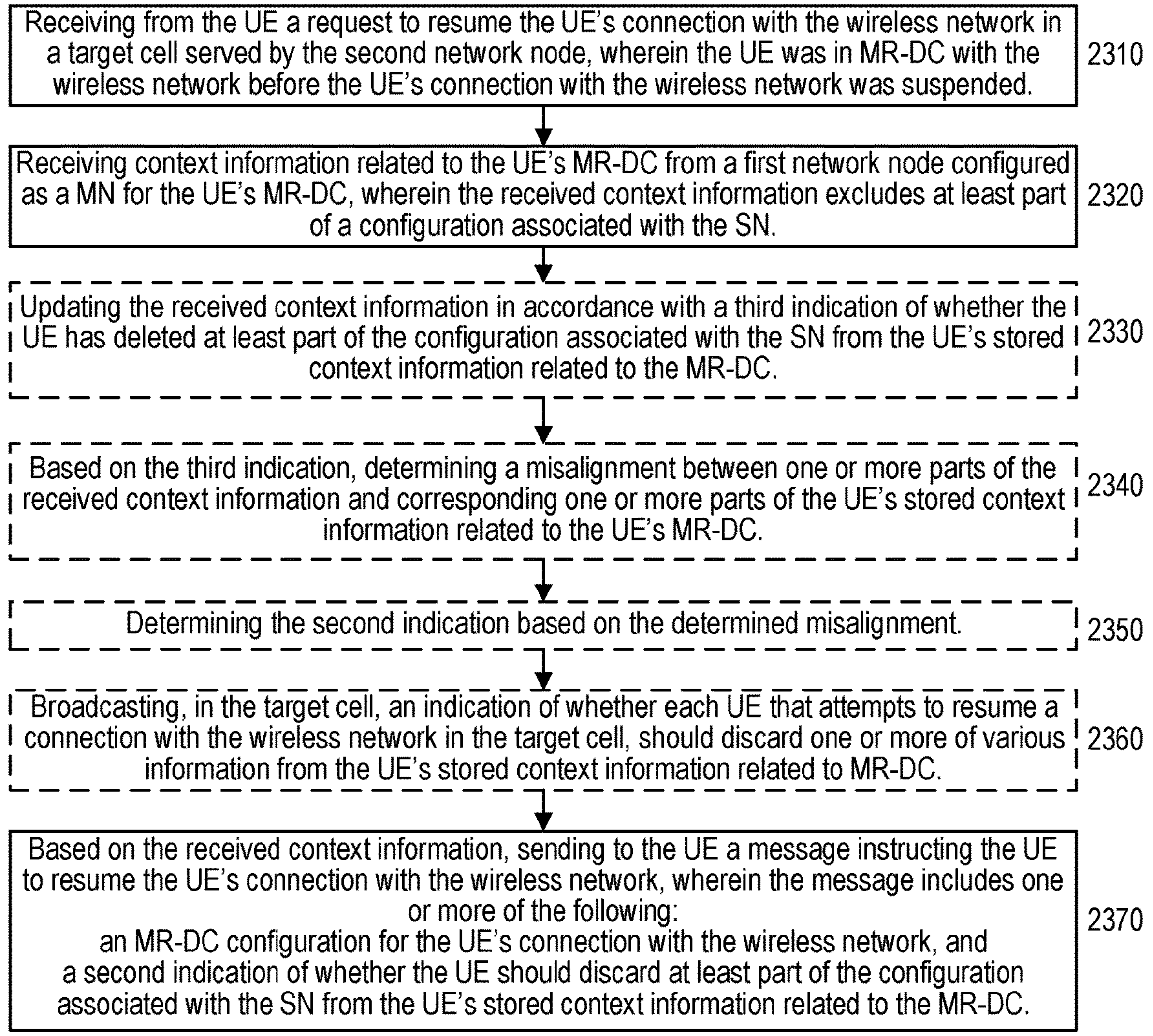
FIG. 23 is a flow diagram of an exemplary method (e.g., procedure) for a second network node, according to various embodiments of the present disclosure.

The embodiments described above can be further illustrated by FIGS. 21-23, which show exemplary methods (e.g., procedures) for a UE, a network node (e.g., MN), and a target network node, respectively. In other words, various features of operations described below correspond to various embodiments described above. The exemplary methods illustrated by FIGS. 21-23 can be used cooperatively to provide various exemplary benefits and/or advantages. Although FIGS. 21-23 show specific blocks in particular orders, the operations of the respective methods can be performed in different orders than shown and can be combined and/or divided into blocks having different functionality than shown. Optional blocks or operations are indicated by dashed lines.

In particular, FIG. 21 shows a flow diagram of an exemplary method (e.g., procedure) for a UE configured for MR-DC with a wireless network, according to various embodiments of the present disclosure. The exemplary method can be performed by a UE (e.g., wireless device, IoT device, modem, etc. or component thereof) such as described elsewhere herein.

The exemplary method can include operations of block 2110, where the UE can store, in the UE, context information related to the UE's MR-DC, wherein the context information includes a configuration associated with a SN for the UE's MR-DC. The exemplary method can also include operations of block 2120, where the UE can receive from the MN a first message that instructs the UE to release MR-DC and suspend the UE's connection with the wireless network. The exemplary method can also include operations of block 2160, where in response to the first message, the UE can release the MR-DC and suspend the UE's connection with the wireless network. The exemplary method can also include operations of block 2190, where the UE can discard (e.g., delete or make unusable in some other way) at least part of the stored context information related to the UE's MR-DC, in response to one of the following:

- receiving the first message (e.g., as illustrated in FIG. 14);
- a first indication to update stored context information related to the UE's MR-DC, included in or with the first message (e.g., as illustrated in FIGS. 17-19); or
- a second indication received from a second network node that is a target node for resuming the UE's connection with the wireless network (e.g., as illustrated in FIG. 20).

In some embodiments, discarding at least part of the stored context information (e.g., in block 2190) is responsive to the first indication, which is included in in the first message (e.g., in block 2120). In some of these embodiments, the first message is an RRCRelease message. FIG. 17 shows an example of these embodiments. In other embodiments, the first message is an RRCReconfiguration message. In some of these embodiments, the exemplary method can also include the operations of block 2130, where the UE can initiate a timer in response to receiving the RRCReconfiguration message. FIGS. 18-19 show examples of these embodiments.

In some variants of these embodiments, the exemplary method can also include operations of blocks 2170-2175, which the UE can perform in response to receiving an RRCRelease message from the first network node before expiration of the timer, as illustrated in FIG. 18. In particular, the UE can select a target cell, served by the second network node, for resuming the UE's connection with the wireless network and send, to the second network node via the target cell, a request to resume the UE's connection to the wireless network.

In some variants of these embodiments, the exemplary method can also include the operations of block 2140, where the UE can send an RRCReconfigurationComplete message to the first network node in response to expiration of the timer without receiving an RRCRelease message from the first network node. FIG. 19 shows an example of these embodiments.

In other embodiments, the exemplary method can also include the operations of blocks 1270-1280. The operations of blocks 1270-1275 were described above. In block 1280, the UE can receive, from the second network node in response to the request (e.g., sent in block 1275), a second message instructing the UE to resume the UE's connection to the wireless network. In some of these embodiments, discarding at least part of the stored context information in block 2190 is responsive to the second indication, which is received according to one of the following: included in or with the second message, or via broadcast in the target cell. FIG. 20 shows an example of the second indication being included in or with the second message (e.g., RRCResume). In some of these embodiments, the second message includes an MR-DC configuration for the UE's connection with the wireless network In some embodiments, discarding at least part of the stored context information related to the UE's MR-DC in block 2190 includes discarding one or more of the following information from the stored context information:

- all of the stored context information;
- all lower-layer configurations related to the UE's MR-DC;
- all higher-layer configurations related to the UE's MR-DC;
- all of the configuration associated with the SN;
- configurations associated with one or more SN packet data convergence protocol (PDCP) entities;
- configurations associated with one or more SN-terminated bearers;
- configurations associated with one or more SN-terminated master cell group (MCG) bearers; and
- configurations associated with one or more SN-terminated secondary cell group (SCG) bearers.

In some of these embodiments, discarding at least part of the stored context information is responsive to one of the first and second indications, which indicates the information to be discarded from the stored context information.

In addition, FIG. 22 shows a flow diagram of an exemplary method (e.g., procedure) for a first network node configured to operate as a MN for a UE's MR-DC with a wireless network, according to various embodiments of the present disclosure. The exemplary method can be performed by a network node (e.g., base station, eNB, gNB, ng-eNB, etc., or components thereof) such as described elsewhere herein.

The exemplary method can include the operations of block 2210, where the first network node can store context information related to the UE's MR-DC. The first network node's stored context information includes a configuration associated with a SN for the UE's MR-DC. The exemplary method can also include the operations of block 2220, where the first network node can send, to the UE, a message instructing the UE to release MR-DC and suspend the UE's connection with the wireless network. The exemplary method can also include the operations of block 2250, where the first network node can update the first network node's stored context information related to the UE's MR-DC in response to releasing the MR-DC and suspending the UE's connection with the wireless network, including discarding at least part of the configuration associated with the SN. The exemplary method can also include the operations of block 2250, where the first network node can send the updated context information related to the UE's MR-DC to a second network node that is a target node for resuming the UE's connection with the wireless network.

In some embodiments, the message includes a first indication for the UE to update stored context information related to the UE's MR-DC, including discarding at least part of the UE's configuration associated with the SN. In some of these embodiments, the first indication indicates whether the UE should discard one or more of the following information from the UE's stored context information related to the UE's MR-DC:

- all of the UE's context information related to the UE's MR-DC;
- all lower-layer configurations related to the UE's MR-DC;
- all higher-layer configurations related to the UE's MR-DC;
- all of the UE's configuration associated with the SN;
- configurations associated with one or more SN PDCP entities;
- configurations associated with one or more SN-terminated bearers;
- configurations associated with one or more SN-terminated MCG bearers; and
- configurations associated with one or more SN-terminated SCG bearers.

In some of these embodiments, updating the stored context information (e.g., in block 2240) is performed by the network node in accordance with the first indication sent to the UE.

In other embodiments, updating the stored context information in block 2240 includes the operations of sub-block 2241, where the first network node adds, to the (first network node's) stored context information, a third indication of whether the UE has discarded one or more of the following from the UE's stored context information related to the UE's MR-DC:

- all of the UE's context information related to the UE's MR-DC;
- all lower-layer configurations related to the UE's MR-DC;
- all higher-layer configurations related to the UE's MR-DC;
- all of the UE's configuration associated with the SN;
- configurations associated with one or more SN PDCP entities;
- configurations associated with one or more SN-terminated bearers;
- configurations associated with one or more SN-terminated MCG bearers; and configurations associated with one or more SN-terminated SCG bearers.

In some of these embodiments, updating the stored context information (e.g., in block 2250) is performed by the first network node in accordance with the third indication added to the updated context information sent to the second network node. In other words, the first network node updates its stored context information, sent to the second network node, to match updates made by the UE to its stored context information.

In some embodiments, the message is an RR(Release message. FIGS. 14 and 17 show examples of these embodiments. In other embodiments, the message is an RRCReconfiguration message. FIGS. 18-20 show examples of these embodiments. In some of these embodiments, the exemplary method can also include the operations of block 2230, where the first network node can receive a responsive RRCReconfigurationComplete from the UE only when the first network node did not send an RRCRelease message to the UE within a duration (e.g., UE timer period) after sending the RRCReconfiguration message. In other of these embodiments, the RRCReconfiguration message is sent with an RRCRelease message in a single MAC-layer PDU.

In addition, FIG. 23 shows a flow diagram of an exemplary method (e.g., procedure) for a second network node configured to operate as a target node for resuming a UE's connection with a wireless network, according to various embodiments of the present disclosure. The exemplary method can be performed by a network node (e.g., base station, eNB, gNB, ng-eNB, etc., or components thereof) such as described elsewhere herein.

The exemplary method can include the operations of block 2310, where the second network node can receive from the UE a request to resume the UE's connection with the wireless network in a target cell served by the second network node. The UE was in MR-DC with the wireless network before the UE's connection with the wireless network was suspended. The exemplary method can also include the operations of block 2320, where the second network node can receive context information related to the UE's MR-DC from a first network node configured as a MN for the UE's MR-DC. The received context information excludes at least part of a configuration associated with the SN. The exemplary method can also include the operations of block 2330, where based on the received context information, the second network node can send to the UE a message instructing the UE to resume the UE's connection with the wireless network. The message includes one or more of the following:

- an MR-DC configuration for the UE's connection with the wireless network, and
- a second indication of whether the UE should discard at least part of the configuration associated with the SN from the UE's stored context information related to the MR-DC.

In some embodiments, the received context information includes a third indication of whether the UE has discarded at least part of the configuration associated with the SN from the UE's stored context information related to the MR-DC. In some of these embodiments, the received context information has been updated by the first network node in accordance with the third indication. In other of these embodiments, the exemplary method also includes the operations of block 2330, where the second network node can update the received context information in accordance with the third indication (e.g., for alignment with the UE's stored context information).

In some of these embodiments, the third indication indicates whether the UE has discarded one or more of the following from the UE's stored context information related to the UE's MR-DC:

- all of the UE's stored context information related to the UE's MR-DC;
- all lower-layer configurations related to the UE's MR-DC;
- all higher-layer configurations related to the UE's MR-DC;
- all of the UE's configuration associated with the SN;
- configurations associated with one or more SN PDCP entities;
- configurations associated with one or more SN-terminated bearers;
- configurations associated with one or more SN-terminated MCG bearers; and
- configurations associated with one or more SN-terminated SCG bearers.

In some of these embodiments, the second message includes the second indication and the exemplary method also includes the operations of block 2340-2350. In block 2340, based on the third indication, the second network node determines a misalignment (e.g., mismatch) between one or more parts of the received context information and corresponding one or more parts of the UE's stored context information related to the UE's MR-DC. In block 2350, the second network node can determine the second indication based on the determined misalignment. For example, the determined second indication can indicate that the UE should discard one or more of the following from the UE's stored context information related to the UE's MR-DC:

- all of the UE's stored context information related to the MR-DC
- all lower-layer configurations related to the UE's MR-DC;
- all higher-layer configurations related to the UE's MR-DC;
- all of the UE's configuration associated with the SN;
- configurations associated with one or more SN PDCP entities;
- configurations associated with one or more SN-terminated bearers;
- configurations associated with one or more SN-terminated MCG bearers; and
- configurations associated with one or more SN-terminated SCG) bearers.

In other embodiments, the message includes the MR-DC configuration but does not include the second indication. Also, the exemplary method can also include the operations of block 2360, where the second network node can broadcast, in the target cell, an indication of whether each UE that attempts to resume a connection with the wireless network in the target cell, should discard one or more of the following information from the UE's stored context information related to MR-DC:

- all of the UE's stored context information related to MR-DC;
- all lower-layer configurations related to MR-DC;
- all higher-layer configurations related to MR-DC;
- all of the UE's configuration associated with the SN;
- configurations associated with one or more SN PDCP entities;
- configurations associated with one or more SN-terminated bearers;
- configurations associated with one or more SN-terminated MCG bearers; and configurations associated with one or more SN-terminated SCG bearers.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 24:
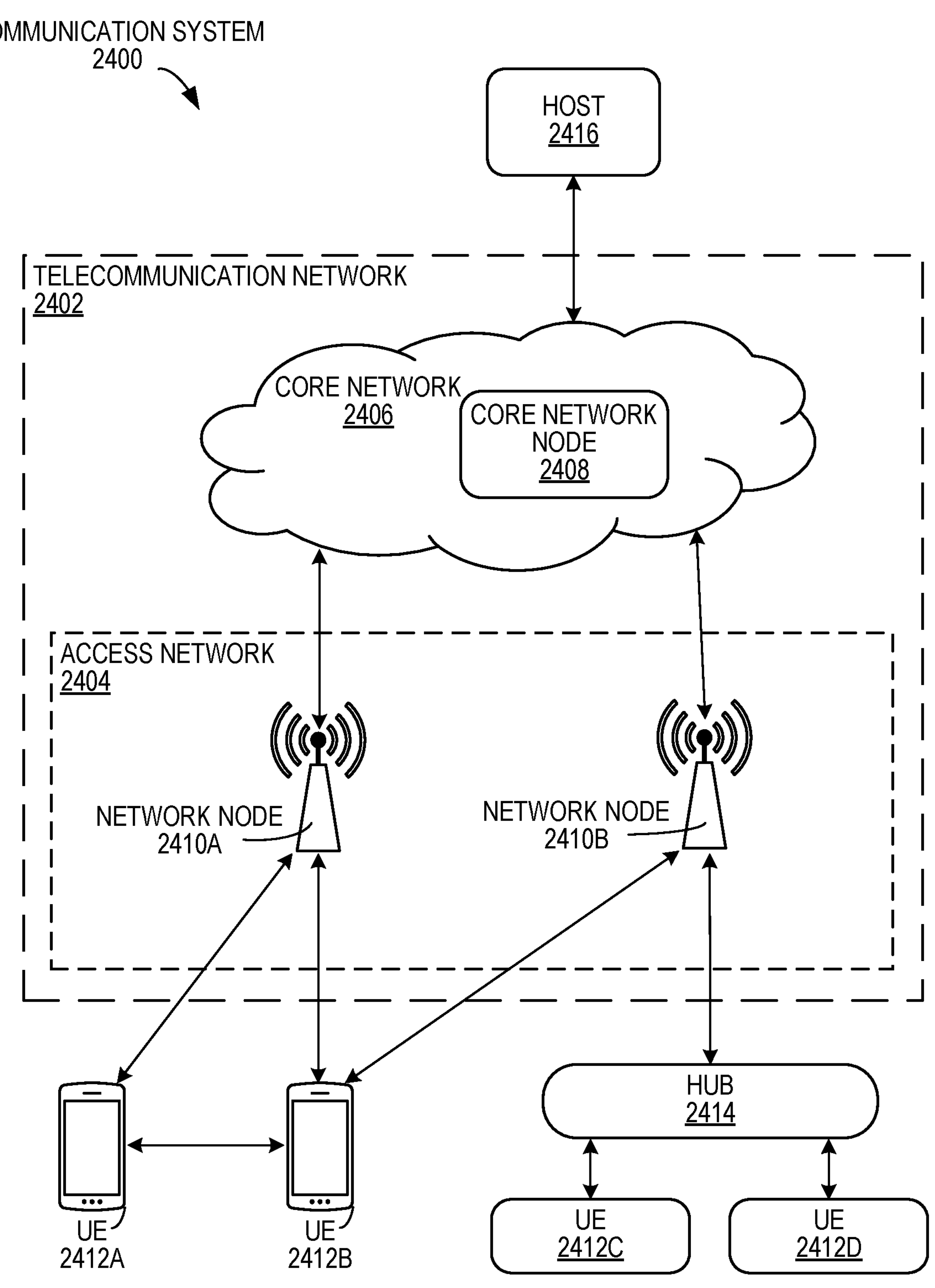
FIG. 24 shows a communication system according to various embodiments of the present disclosure.

FIG. 24 shows an example of a communication system 2400 in accordance with some embodiments. In this example, the communication system 2400 includes a telecommunication network 2402 that includes an access network 2404, such as a radio access network (RAN), and a core network 2406, which includes one or more core network nodes 2408. The access network 2404 includes one or more access network nodes, such as network nodes 2410*a* and 2410*b* (one or more of which may be generally referred to as network nodes 2410), or any other similar 3GPP access node or non-3GPP access point. The network nodes 2410 facilitate direct or indirect connection of UEs, such as by connecting UEs 2412*a*, 2412*b*, 2412*c*, and 2412*d* (one or more of which may be generally referred to as UEs 2412) to the core network 2406 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 2400 may include any number of wired or wireless networks, network nodes, UEs, and/or any other components or systems that may facilitate or participate in the communication of data and/or signals whether via wired or wireless connections. The communication system 2400 may include and/or interface with any type of communication, telecommunication, data, cellular, radio network, and/or other similar type of system.

The UEs 2412 may be any of a wide variety of communication devices, including wireless devices arranged, configured, and/or operable to communicate wirelessly with the network nodes 2410 and other communication devices. Similarly, the network nodes 2410 are arranged, capable, configured, and/or operable to communicate directly or indirectly with the UEs 2412 and/or with other network nodes or equipment in the telecommunication network 2402 to enable and/or provide network access, such as wireless network access, and/or to perform other functions, such as administration in the telecommunication network 2402.

In the depicted example, the core network 2406 connects the network nodes 2410 to one or more hosts, such as host 2416. These connections may be direct or indirect via one or more intermediary networks or devices. In other examples, network nodes may be directly coupled to hosts. The core network 2406 includes one more core network nodes (e.g., core network node 2408) that are structured with hardware and software components. Features of these components may be substantially similar to those described with respect to the UEs, network nodes, and/or hosts, such that the descriptions thereof are generally applicable to the corresponding components of the core network node 2408. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 2416 may be under the ownership or control of a service provider other than an operator or provider of the access network 2404 and/or the telecommunication network 2402, and may be operated by the service provider or on behalf of the service provider. The host 2416 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 2400 of FIG. 24 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 20) 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) 25 standards such as LoRa and Sigfox.

In some examples, the telecommunication network 2402 is a cellular network that implements 3GPP standardized features. Accordingly, the telecommunications network 2402 may support network slicing to provide different logical networks to different devices that are connected to the telecommunication network 2402. For example, the telecommunications network 2402 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 2412 are configured to transmit and/or receive information without direct human interaction. For instance, a UE may be designed to transmit information to the access network 2404 on a predetermined schedule, when triggered by an internal or external event, or in response to requests from the access network 2404. Additionally, a UE may be configured for operating in single- or multi-RAT or multi-standard mode. For example, a UE may operate with any one or combination of Wi-Fi, NR (New Radio) and LTE, i.e., being configured for multi-radio dual connectivity (MR-DC), such as E-UTRAN (Evolved-UMTS Terrestrial Radio Access Network) New Radio-Dual Connectivity (EN-DC).

In the example, the hub 2414 communicates with the access network 2404 to facilitate indirect communication between one or more UEs (e.g., UE 2412*c* and/or 2412*d*) and network nodes (e.g., network node 2410*b*). In some examples, the hub 2414 may be a controller, router, content source and analytics, or any of the other communication devices described herein regarding UEs. For example, the hub 2414 may be a broadband router enabling access to the core network 2406 for the UEs. As another example, the hub 2414 may be a controller that sends commands or instructions to one or more actuators in the UEs. Commands or instructions may be received from the UEs, network nodes 2410, or by executable code, script, process, or other instructions in the hub 2414. As another example, the hub 2414 may be a data collector that acts as temporary storage for UE data and, in some embodiments, may perform analysis or other processing of the data. As another example, the hub 2414 may be a content source. For example, for a UE that is a VR headset, display, loudspeaker or other media delivery device, the hub 2414 may retrieve VR assets, video, audio, or other media or data related to sensory information via a network node, which the hub 2414 then provides to the UE either directly, after performing local processing, and/or after adding additional local content. In still another example, the hub 2414 acts as a proxy server or orchestrator for the UEs, in particular in if one or more of the UEs are low energy IoT devices.

The hub 2414 may have a constant/persistent or intermittent connection to the network node 2410*b*. The hub 2414 may also allow for a different communication scheme and/or schedule between the hub 2414 and UEs (e.g., UE 2412*c* and/or 2412*d*), and between the hub 2414 and the core network 2406. In other examples, the hub 2414 is connected to the core network 2406 and/or one or more UEs via a wired connection. Moreover, the hub 2414 may be configured to connect to an M2M service provider over the access network 2404 and/or to another UE over a direct connection. In some scenarios, UEs may establish a wireless connection with the network nodes 2410 while still connected via the hub 2414 via a wired or wireless connection. In some embodiments, the hub 2414 may be a dedicated hub—that is, a hub whose primary function is to route communications to/from the UEs from/to the network node 2410*b*. In other embodiments, the hub 2414 may be a non-dedicated hub—that is, a device which is capable of operating to route communications between the UEs and network node 2410*b*, but which is additionally capable of operating as a communication start and/or end point for certain data channels.

Figure 25:
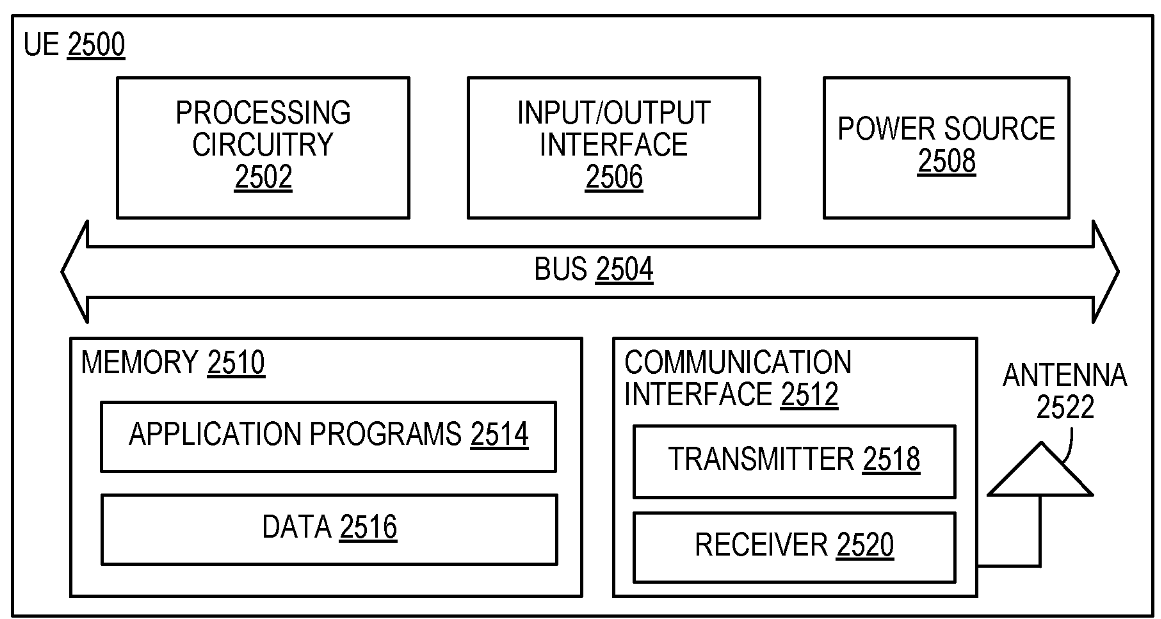
FIG. 25 shows a UE according to various embodiments of the present disclosure.

FIG. 25 shows a UE 2500 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 2500 includes processing circuitry 2502 that is operatively coupled via a bus 2504 to an input/output interface 2506, a power source 2508, a memory 2510, a communication interface 2512, and/or any other component, or any combination thereof. Certain UEs may utilize all or a subset of the components shown in FIG. 25. The level of integration between the components may vary from one UE to another UE. Further, certain UEs may contain multiple instances of a component, such as multiple processors, memories, transceivers, transmitters, receivers, etc.

The processing circuitry 2502 is configured to process instructions and data and may be configured to implement any sequential state machine operative to execute instructions stored as machine-readable computer programs in the memory 2510. The processing circuitry 2502 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 2502 may include multiple central processing units (CPUs).

In the example, the input/output interface 2506 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 2500. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 2508 is structured as a battery or battery pack. Other types of power sources, such as an external power source (e.g., an electricity outlet), photovoltaic device, or power cell, may be used. The power source 2508 may further include power circuitry for delivering power from the power source 2508 itself, and/or an external power source, to the various parts of the UE 2500 via input circuitry or an interface such as an electrical power cable. Delivering power may be, for example, for charging of the power source 2508. Power circuitry may perform any formatting, converting, or other modification to the power from the power source 2508 to make the power suitable for the respective components of the UE 2500 to which power is supplied.

The memory 2510 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 2510 includes one or more application programs 2514, such as an operating system, web browser application, a widget, gadget engine, or other application, and corresponding data 2516. The memory 2510 may store, for use by the UE 2500, any of a variety of various operating systems or combinations of operating systems.

The memory 2510 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 2510 may allow the UE 2500 to access instructions, application programs and the like, stored on transitory or non-transitory memory media, to off-load data, or to upload data. An article of manufacture, such as one utilizing a communication system may be tangibly embodied as or in the memory 2510, which may be or comprise a device-readable storage medium.

The processing circuitry 2502 may be configured to communicate with an access network or other network using the communication interface 2512. The communication interface 2512 may comprise one or more communication subsystems and may include or be communicatively coupled to an antenna 2522. The communication interface 2512 may include one or more transceivers used to communicate, such as by communicating with one or more remote transceivers of another device capable of wireless communication (e.g., another UE or a network node in an access network). Each transceiver may include a transmitter 2518 and/or a receiver 2520 appropriate to provide network communications (e.g., optical, electrical, frequency allocations, and so forth). Moreover, the transmitter 2518 and receiver 2520 may be coupled to one or more antennas (e.g., antenna 2522) and may share circuit components, software or firmware, or alternatively be implemented separately.

In the illustrated embodiment, communication functions of the communication interface 2512 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 2512, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., an alert is sent when moisture is detected), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 2500 shown in FIG. 25.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g., by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 26:
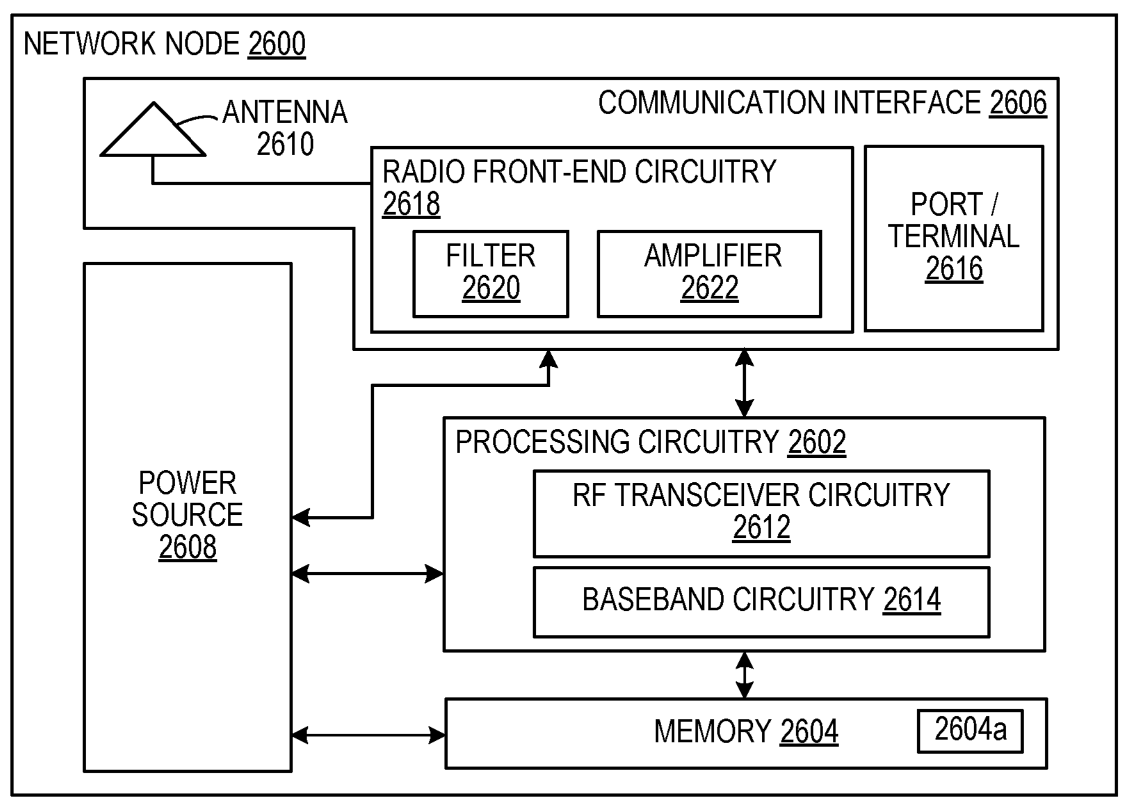
FIG. 26 shows a network node according to various embodiments of the present disclosure.

FIG. 26 shows a network node 2600 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 2600 includes a processing circuitry 2602, a memory 2604, a communication interface 2606, and a power source 2608. The network node 2600 may be composed of multiple physically separate components (e.g., a NodeB component and a RNC component, or a BTS component and a BSC component, etc.), which may each have their own respective components. In certain scenarios in which the network node 2600 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 2600 may be configured to support multiple radio access technologies (RATs). In such embodiments, some components may be duplicated (e.g., separate memory 2604 for different RATs) and some components may be reused (e.g., a same antenna 2610 may be shared by different RATs). The network node 2600 may also include multiple sets of the various illustrated components for different wireless technologies integrated into network node 2600, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 2600.

The processing circuitry 2602 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 2600 components, such as the memory 2604, to provide network node 2600 functionality.

In some embodiments, the processing circuitry 2602 includes a system on a chip (SOC). In some embodiments, the processing circuitry 2602 includes one or more of radio frequency (RF) transceiver circuitry 2612 and baseband processing circuitry 2614. In some embodiments, the radio frequency (RF) transceiver circuitry 2612 and the baseband processing circuitry 2614 may be on separate chips (or sets of chips), boards, or units, such as radio units and digital units. In alternative embodiments, part or all of RF transceiver circuitry 2612 and baseband processing circuitry 2614 may be on the same chip or set of chips, boards, or units.

The memory 2604 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 2602. The memory 2604 may store any suitable instructions, data, or information, including a computer program, software, an application including one or more of logic, rules, code, tables, and/or other instructions (collectively denoted computer program product 2604*a*) that can be executed by processing circuitry 2602 and utilized by network node 2600. The memory 2604 may be used to store any calculations made by processing circuitry 2602 and/or any data received via communication interface 2606. In some embodiments, processing circuitry 2602 and memory 2604 can be integrated.

The communication interface 2606 is used in wired or wireless communication of signaling and/or data between a network node, access network, and/or UE. As illustrated, the communication interface 2606 comprises port(s)/terminal(s) 2616 to send and receive data, for example to and from a network over a wired connection. The communication interface 2606 also includes radio front-end circuitry 2618 that may be coupled to, or in certain embodiments a part of, the antenna 2610. Radio front-end circuitry 2618 comprises filters 2620 and amplifiers 2622. The radio front-end circuitry 2618 may be connected to an antenna 2610 and processing circuitry 2602. The radio front-end circuitry may be configured to condition signals communicated between antenna 2610 and processing circuitry 2602. The radio front-end circuitry 2618 may receive digital data that is to be sent out to other network nodes or UEs via a wireless connection. The radio front-end circuitry 2618 may convert the digital data into a radio signal having the appropriate channel and bandwidth parameters using a combination of filters 2620 and/or amplifiers 2622. The radio signal may then be transmitted via the antenna 2610. Similarly, when receiving data, the antenna 2610 may collect radio signals which are then converted into digital data by the radio front-end circuitry 2618. The digital data may be passed to the processing circuitry 2602. In other embodiments, the communication interface may comprise different components and/or different combinations of components.

In certain alternative embodiments, the network node 2600 does not include separate radio front-end circuitry 2618, instead, the processing circuitry 2602 includes radio front-end circuitry and is connected to the antenna 2610. Similarly, in some embodiments, all or some of the RF transceiver circuitry 2612 is part of the communication interface 2606. In still other embodiments, the communication interface 2606 includes one or more ports or terminals 2616, the radio front-end circuitry 2618, and the RF transceiver circuitry 2612, as part of a radio unit (not shown), and the communication interface 2606 communicates with the baseband processing circuitry 2614, which is part of a digital unit (not shown).

The antenna 2610 may include one or more antennas, or antenna arrays, configured to send and/or receive wireless signals. The antenna 2610 may be coupled to the radio front-end circuitry 2618 and may be any type of antenna capable of transmitting and receiving data and/or signals wirelessly. In certain embodiments, the antenna 2610 is separate from the network node 2600 and connectable to the network node 2600 through an interface or port.

The antenna 2610, communication interface 2606, and/or the processing circuitry 2602 may be configured to perform any receiving operations and/or certain obtaining operations described herein as being performed by the network node. Any information, data and/or signals may be received from a UE, another network node and/or any other network equipment. Similarly, the antenna 2610, the communication interface 2606, and/or the processing circuitry 2602 may be configured to perform any transmitting operations described herein as being performed by the network node. Any information, data and/or signals may be transmitted to a UE, another network node and/or any other network equipment.

The power source 2608 provides power to the various components of network node 2600 in a form suitable for the respective components (e.g., at a voltage and current level needed for each respective component). The power source 2608 may further comprise, or be coupled to, power management circuitry to supply the components of the network node 2600 with power for performing the functionality described herein. For example, the network node 2600 may be connectable to an external power source (e.g., the power grid, an electricity outlet) via an input circuitry or interface such as an electrical cable, whereby the external power source supplies power to power circuitry of the power source 2608. As a further example, the power source 2608 may comprise a source of power in the form of a battery or battery pack which is connected to, or integrated in, power circuitry. The battery may provide backup power should the external power source fail.

Embodiments of the network node 2600 may include additional components beyond those shown in FIG. 26 for providing certain aspects of the network node's functionality, including any of the functionality described herein and/or any functionality necessary to support the subject matter described herein. For example, the network node 2600 may include user interface equipment to allow input of information into the network node 2600 and to allow output of information from the network node 2600. This may allow a user to perform diagnostic, maintenance, repair, and other administrative functions for the network node 2600.

Figure 27:
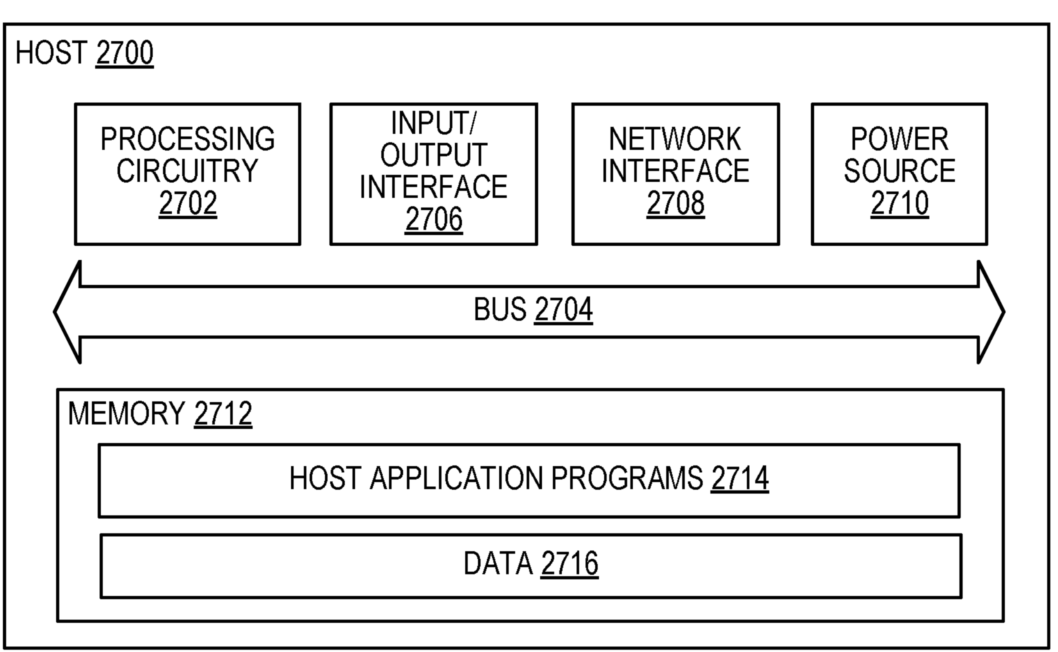
FIG. 27 shows host computing system according to various embodiments of the present disclosure.

FIG. 27 is a block diagram of a host 2700, which may be an embodiment of the host 2416 of FIG. 24, in accordance with various aspects described herein. As used herein, the host 2700 may be or comprise various combinations hardware and/or software, including a standalone server, a blade server, a cloud-implemented server, a distributed server, a virtual machine, container, or processing resources in a server farm. The host 2700 may provide one or more services to one or more UEs.

The host 2700 includes processing circuitry 2702 that is operatively coupled via a bus 2704 to an input/output interface 2706, a network interface 2708, a power source 2710, and a memory 2712. Other components may be included in other embodiments. Features of these components may be substantially similar to those described with respect to the devices of previous figures, such as FIGS. 25 and 26, such that the descriptions thereof are generally applicable to the corresponding components of host 2700.

The memory 2712 may include one or more computer programs including one or more host application programs 2714 and data 2716, which may include user data, e.g., data generated by a UE for the host 2700 or data generated by the host 2700 for a UE. Embodiments of the host 2700 may utilize only a subset or all of the components shown. The host application programs 2714 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 2714 may also provide for user authentication and licensing checks and may periodically report health, routes, and content availability to a central node, such as a device in or on the edge of a core network. Accordingly, the host 2700 may select and/or indicate a different host for over-the-top services for a UE. The host application programs 2714 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 28:
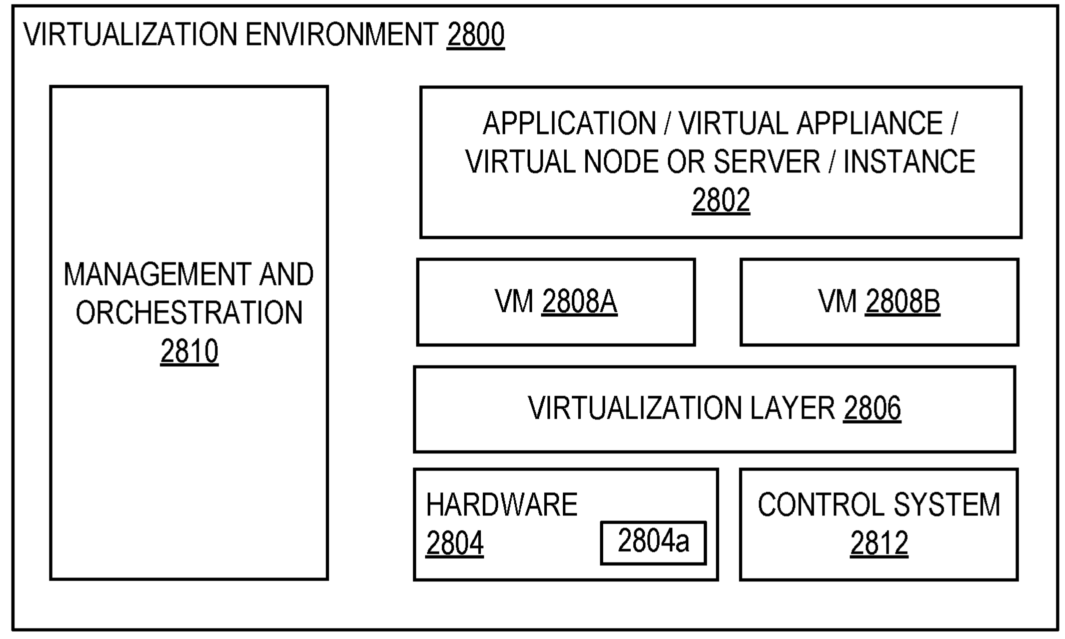
FIG. 28 is a block diagram of a virtualization environment in which functions implemented by some embodiments of the present disclosure may be virtualized.

FIG. 28 is a block diagram illustrating a virtualization environment 2800 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 2800 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 2802 (which may alternatively be called software instances, virtual appliances, network functions, virtual nodes, virtual network functions, etc.) are run in the virtualization environment 2800 to implement some of the features, functions, and/or benefits of some of the embodiments disclosed herein.

Hardware 2804 includes processing circuitry, memory that stores software and/or instructions (collectively denoted computer program product 2804*a*) executable by hardware processing circuitry, and/or other hardware devices as described herein, such as a network interface, input/output interface, and so forth. Software may be executed by the processing circuitry to instantiate one or more virtualization layers 2806 (also referred to as hypervisors or virtual machine monitors (VMMs)), provide VMs 2808*a* and 2808*b* (one or more of which may be generally referred to as VMs 2808), and/or perform any of the functions, operations, and/or procedures related to some embodiments described herein. The virtualization layer 2806 may present a virtual operating platform that appears like networking hardware to the VMs 2808.

The VMs 2808 comprise virtual processing, virtual memory, virtual networking or interface and virtual storage, and may be run by a corresponding virtualization layer 2806. Different embodiments of the instance of a virtual appliance 2802 may be implemented on one or more of VMs 2808, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 2808 may be a software implementation of a physical machine that runs programs as if they were executing on a physical, non-virtualized machine. Each of the VMs 2808, and that part of hardware 2804 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 2808 on top of the hardware 2804 and corresponds to the application 2802.

Hardware 2804 may be implemented in a standalone network node with generic or specific components. Hardware 2804 may implement some functions via virtualization. Alternatively, hardware 2804 may be part of a larger cluster of hardware (e.g., such as in a data center or CPE) where many hardware nodes work together and are managed via management and orchestration 2810, which, among others, oversees lifecycle management of applications 2802. In some embodiments, hardware 2804 is coupled to one or more radio units that each include one or more transmitters and one or more receivers that may be coupled to one or more antennas. Radio units 30) may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 2812 which may alternatively be used for communication between hardware nodes and radio units.

Figure 29:
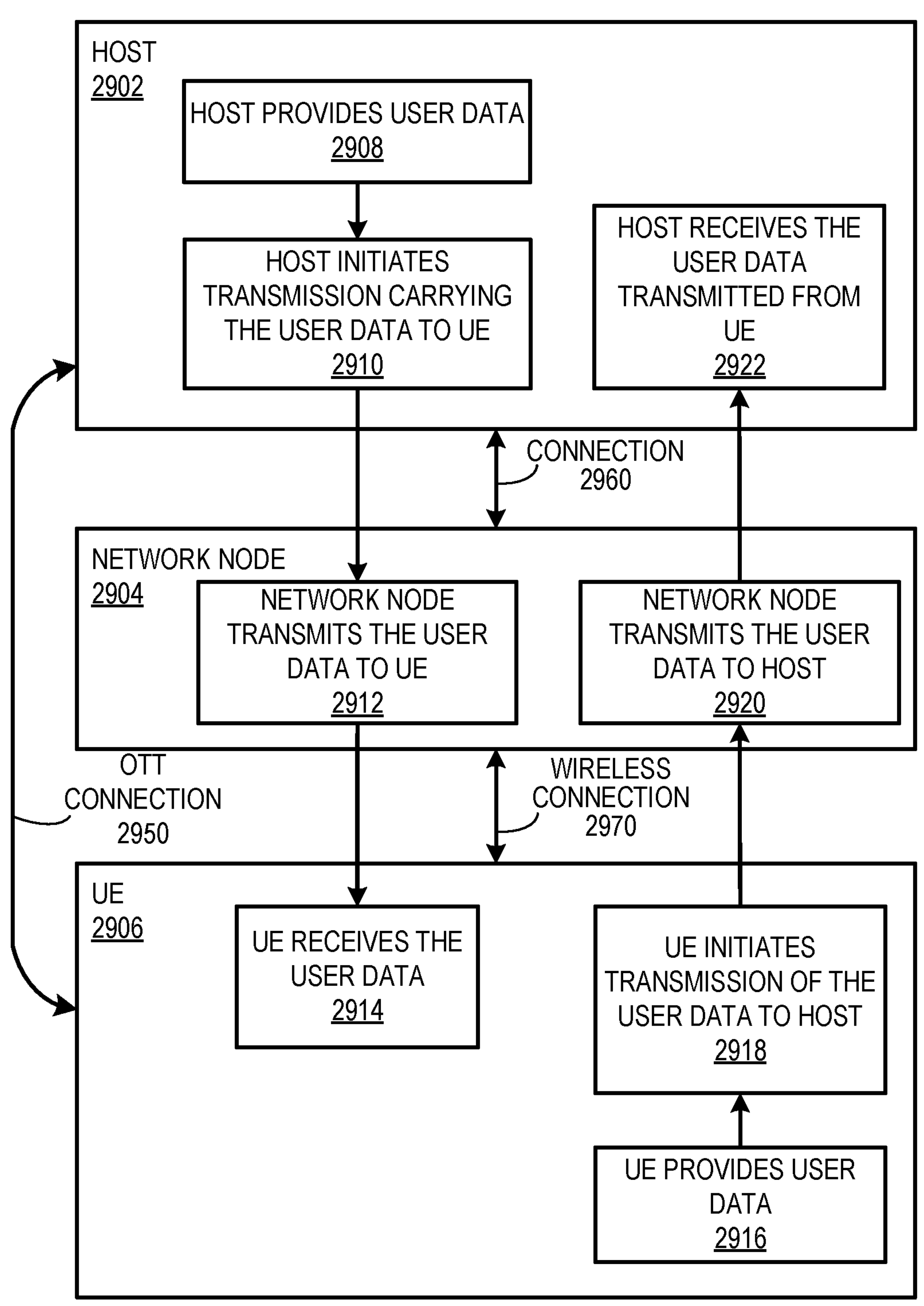
FIG. 29 illustrates communication between a host computing system, a network node, and a UE via multiple connections, at least one of which is wireless, according to various embodiments of the present disclosure.

FIG. 29 shows a communication diagram of a host 2902 communicating via a network node 2904 with a UE 2906 over a partially wireless connection in accordance with some embodiments. Example implementations, in accordance with various embodiments, of the UE (such as a UE 2412*a* of FIG. 24 and/or UE 2500 of FIG. 25), network node (such as network node 2410*a* of FIG. 24 and/or network node 2600 of FIG. 26), and host (such as host 2416 of FIG. 24 and/or host 2700 of FIG. 27) discussed in the preceding paragraphs will now be described with reference to FIG. 29.

Like host 2700, embodiments of host 2902 include hardware, such as a communication interface, processing circuitry, and memory. The host 2902 also includes software, which is stored in or accessible by the host 2902 and executable by the processing circuitry. The software includes a host application that may be operable to provide a service to a remote user, such as the UE 2906 connecting via an over-the-top (OTT) connection 2950 extending between the UE 2906 and host 2902. In providing the service to the remote user, a host application may provide user data which is transmitted using the OTT connection 2950.

The network node 2904 includes hardware enabling it to communicate with the host 2902 and UE 2906. The connection 2960 may be direct or pass through a core network (like core network 2406 of FIG. 24) and/or one or more other intermediate networks, such as one or more public, private, or hosted networks. For example, an intermediate network may be a backbone network or the Internet.

The UE 2906 includes hardware and software, which is stored in or accessible by UE 2906 and executable by the UE's processing circuitry. The software includes a client application, such as a web browser or operator-specific "app" that may be operable to provide a service to a human or non-human user via UE 2906 with the support of the host 2902. In the host 2902, an executing host application may communicate with the executing client application via the OTT connection 2950 terminating at the UE 2906 and host 2902. In providing the service to the user, the UE's client application may receive request data from the host's host application and provide user data in response to the request data. The OTT connection 2950 may transfer both the request data and the user data. The UE's client application may interact with the user to generate the user data that it provides to the host application through the OTT connection 2950.

The OTT connection 2950 may extend via a connection 2960 between the host 2902 and the network node 2904 and via a wireless connection 2970 between the network node 2904 and the UE 2906 to provide the connection between the host 2902 and the UE 2906. The connection 2960 and wireless connection 2970, over which the OTT connection 2950 may be provided, have been drawn abstractly to illustrate the communication between the host 2902 and the UE 2906 via the network node 2904, without explicit reference to any intermediary devices and the precise routing of messages via these devices.

As an example of transmitting data via the OTT connection 2950, in step 2908, the host 2902 provides user data, which may be performed by executing a host application. In some embodiments, the user data is associated with a particular human user interacting with the UE 2906. In other embodiments, the user data is associated with a UE 2906 that shares data with the host 2902 without explicit human interaction. In step 2910, the host 2902 initiates a transmission carrying the user data towards the UE 2906. The host 2902 may initiate the transmission responsive to a request transmitted by the UE 2906. The request may be caused by human interaction with the UE 2906 or by operation of the client application executing on the UE 2906. The transmission may pass via the network node 2904, in accordance with the teachings of the embodiments described throughout this disclosure. Accordingly, in step 2912, the network node 2904 transmits to the UE 2906 the user data that was carried in the transmission that the host 2902 initiated, in accordance with the teachings of the embodiments described throughout this disclosure. In step 2914, the UE 2906 receives the user data carried in the transmission, which may be performed by a client application executed on the UE 2906 associated with the host application executed by the host 2902.

In some examples, the UE 2906 executes a client application which provides user data to the host 2902. The user data may be provided in reaction or response to the data received from the host 2902. Accordingly, in step 2916, the UE 2906 may provide user data, which may be performed by executing the client application. In providing the user data, the client application may further consider user input received from the user via an input/output interface of the UE 2906. Regardless of the specific manner in which the user data was provided, the UE 2906 initiates, in step 2918, transmission of the user data towards the host 2902 via the network node 2904. In step 2920, in accordance with the teachings of the embodiments described throughout this disclosure, the network node 2904 receives user data from the UE 2906 and initiates transmission of the received user data towards the host 2902. In step 2922, the host 2902 receives the user data carried in the transmission initiated by the UE 2906.

One or more of the various embodiments improve the performance of OTT services provided to the UE 2906 using the OTT connection 2950, in which the wireless connection 2970 forms the last segment. More precisely, embodiments can reduce, eliminate, and/or mitigate misalignment between the network and the UE when the UE in RRC_CONNECTED state is configured with MR-DC (particularly SN-terminated bearers) and an MR-DC release is triggered by the MN. This may occur for example when the UE is suspended to RRC_INACTIVE state. Embodiments can address this potential misalignment by making the network aware of whether the SN-terminated bearers and the PDCP entity at the SN are released or not by the UE during the MR-DC release procedure. Accordingly, this can avoid problematic context mismatches when the UE resumes the suspended connection, which improves both UE and network performance. Both end-users and providers of OTT services benefit from such improved performance.

In an example scenario, factory status information may be collected and analyzed by the host 2902. As another example, the host 2902 may process audio and video data which may have been retrieved from a UE for use in creating maps. As another example, the host 2902 may collect and analyze real-time data to assist in controlling vehicle congestion (e.g., controlling traffic lights). As another example, the host 2902 may store surveillance video uploaded by a UE. As another example, the host 2902 may store or control access to media content such as video, audio, VR or AR which it can broadcast, multicast or unicast to UEs. As other examples, the host 2902 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 2950 between the host 2902 and UE 2906, in response to variations in the measurement results. The measurement procedure and/or the network functionality for reconfiguring the OTT connection may be implemented in software and hardware of the host 2902 and/or UE 2906. In some embodiments, sensors (not shown) may be deployed in or in association with other devices through which the OTT connection 2950 passes; the sensors may participate in the measurement procedure by supplying values of the monitored quantities exemplified above, or supplying values of other physical quantities from which software may compute or estimate the monitored quantities. The reconfiguring of the OTT connection 2950 may include message format, retransmission settings, preferred routing etc.; the reconfiguring need not directly alter the operation of the network node 2904. Such procedures and functionalities may be known and practiced in the art. In certain embodiments, measurements may involve proprietary UE signaling that facilitates measurements of throughput, propagation times, latency and the like, by the host 2902. The measurements may be implemented in that software causes messages to be transmitted, in particular empty or 'dummy' messages, using the OTT connection 2950 while monitoring propagation times, errors, etc.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The techniques and apparatus described herein include, but are not limited to, the following enumerated examples:

A1. A method for a user equipment (UE) configured for multi-radio access technology dual-connectivity (MR-DC) with a master node (MN) and a secondary node (SN) in a wireless network, the method comprising:

storing, in the UE, context information related to the UE's MR-DC with the MN and the SN, wherein the context information includes a configuration associated with the SN;

receiving, from the MN, a first message instructing the UE to release MR-DC and suspend the UE's connection to the wireless network;

in response to the first message, releasing the MR-DC and suspending the UE's connection to the wireless network;

receiving, from a target node in the wireless network, a second message instructing the UE to resume the UE's connection to the wireless network; and selectively deleting at least part of the configuration associated with the SN, in response to one of the following:

receiving the first message;

a first indication included in or with the first message; or a second indication received from the target node.

A2. The method of embodiment A1, further comprising:

selecting a target cell, served by the target node, for resuming the UE's connection to the wireless network; and sending, to the target node via the target cell, a request to resume the UE's connection to the wireless network, wherein the second message is received in response to the request.

A3. The method of any of embodiments A1-A2, wherein selectively deleting at least part of the configuration is responsive to the first indication, which is included in in the first message.

A4. The method of any of embodiments A1-A3, wherein the first message is an RRCRelease message.

A5. The method of any of embodiments A1-A3, wherein the first message is an RRCReconfiguration message.

A6. The method of embodiment A5, wherein:

the method further comprises initiating a timer in response to receiving the first message;

the request to resume is sent to the target node based on receiving an RRCRelease message from the MN before expiration of the timer; and the method further comprises sending a responsive RRCReconfigurationComplete message to the MN based on expiration of the timer without receiving an RRCRelease message from the MN.

A7. The method of embodiment A5, further comprising refraining from sending a responsive RRCReconfigurationComplete message when the first message is received with an RRCRelease message in a single MAC-layer protocol data unit (PDU).

A8. The method of any of embodiments A1-A2, wherein selectively deleting at least part of the configuration is responsive to the second indication, which is included in in the second message.

A9. The method of embodiment A2, wherein selectively deleting at least part of the configuration is responsive to the second indication, which is received via broadcast in the target cell.

A10. The method of any of embodiments A3-A9, wherein the one of the first and second indications, to which selectively deleting is responsive, indicates whether or not the UE should delete one of the following from the stored context information related to the UE's MR-DC with the MN and the SN:

all context information;

all lower-layer configurations;

all higher-layer configurations;

the configuration associated with the SN;

configurations associated with SN PDCP entities;

configuration associated with all SN-terminated bearers;

configurations associated with SN-terminated master cell group (MCG) bearers; and configurations associated with SN-terminated secondary cell group (SCG) bearers.

A11. The method of any of embodiments A1-A10, wherein the second message includes a MR-DC configuration for the UE's connection to the wireless network.

B1. A method for a network node configured as a master node (MN) for a user equipment's (UE) multi-radio access technology dual-connectivity (MR-DC) with a wireless network, the method comprising:

storing context information related to the UE's MR-DC with the MN and the SN, wherein the context information includes a configuration associated with the SN;

sending, to the UE, a first message instructing the UE to release MR-DC and suspend the UE's connection to the wireless network;

updating the stored context information in response to releasing the MR-DC and suspending the UE's connection to the wireless network, including deleting at least part of the stored configuration associated with the SN; and subsequently sending the stored context information to a target node for resuming the UE's connection to the wireless network.

B2. The method of embodiment B1, wherein the first message includes a first indication for the UE to update stored context information related to the UE's MR-DC connection, including deleting at least part of the UE's stored configuration associated with the SN.

B3. The method of embodiment B2, wherein the first indication indicates whether or not the UE should delete one of the following from the UE's stored context information related to the UE's MR-DC with the MN and the SN:

all context information;
all lower-layer configurations;
all higher-layer configurations;
the configuration associated with the SN;
configurations associated with SN PDCP entities;
configurations associated with all SN-terminated bearers;
configurations associated with SN-terminated master cell group (MCG) bearers; and
configurations associated with SN-terminated secondary cell group (SCG) bearers.

B4. The method of embodiment B3, wherein updating the stored context information is performed by the network node in accordance with the first indication sent to the UE.

B5. The method of any of embodiments B1-B4, wherein updating the stored context information comprises adding a second indication of whether or not the UE has deleted one of the following from the UE's stored context information related to the UE's MR-DC with the MN and the SN:

all context information;
all lower-layer configurations;
all higher-layer configurations;
the configuration associated with the SN;
configurations associated with SN PDCP entities;
configurations associated with all SN-terminated bearers;
configurations associated with SN-terminated master cell group (MCG) bearers; and
configurations associated with SN-terminated secondary cell group (SCG) bearers.

B6. The method of embodiment B5, wherein updating the stored context information is performed by the network node in accordance with the second indication.

B7. The method of any of embodiments B1-B6, wherein the first message is an RRCRelease message.

B8. The method of any of embodiments B1-B6, wherein the first message is an RRCReconfiguration message.

B9. The method of embodiment B8, further comprising receiving a responsive RRCReconfigurationComplete from the UE only when the network node does not send an RRCRelease message to the UE within a duration after sending the first message.

B10. The method of embodiment B8, wherein the first message is sent with an RRCRelease message in a single MAC-layer protocol data unit (PDU).

C1. A method for a network node configured as a target node for a user equipment (UE) to resume a suspended connection with a wireless network, the method comprising:

receiving, from the UE, a request to resume the UE's suspended connection to the wireless network in a target cell served by the network node, wherein the UE was in multi-radio access technology dual-connectivity (MR-DC) with a master node (MN) and a secondary node (SN) in a wireless network before the connection was suspended;

receiving, from the MN, context information related to the UE's MR-DC with the MN and the SN;

selectively updating the received context information based on one of more of the following:

whether the context information includes a configuration associated with the SN; and an indication, from the MN, of whether or not the UE has deleted at least a portion of the UE's stored context information related to the UE's MR-DC with the MN and the SN; and sending, to the UE, a second message instructing the UE to resume the UE's connection to the wireless network.

C2. The method of embodiment C1, wherein the indication is included in the received context information.

C3. The method of any of embodiments C1-C2, wherein the indication indicates whether or not the UE has deleted at least one of the following from the UE's stored context information related to the UE's MR-DC with the MN and the SN:

all context information;
all lower-layer configurations;
all higher-layer configurations;
all configurations associated with the SN;
configurations associated with SN PDCP entities;
configurations associated with all SN-terminated bearers;
configurations associated with SN-terminated master cell group (MCG) bearers; and
configurations associated with SN-terminated secondary cell group (SCG) bearers.

C4. The method of embodiment C3, wherein the received context information has been updated by the MN in accordance with the indication.

C5. The method of embodiment C3, wherein selectively updating the received context information comprises updating the received context information in accordance with the indication.

C6. The method of embodiments C1-C3, further comprising, based on the received context information and the indication, determining a degree of misalignment between received context information and the UE's stored context information related to the UE's MR-DC with the MN and the SN.

C7. The method of embodiment C6, further comprising, based on the degree of misalignment, determining a second indication of whether or not the UE should delete at least one of the following from the UE's stored context information related to the UE's MR-DC with the MN and the SN:

all context information;
all lower-layer configurations;
all higher-layer configurations;
all configurations associated with the SN;
configurations associated with SN PDCP entities;
configurations associated with all SN-terminated bearers;
configurations associated with SN-terminated master cell group (MCG) bearers; and
configurations associated with SN-terminated secondary cell group (SCG) bearers.

C8. The method of embodiment C7, wherein the second message includes the second indication.

C9. The method of any of embodiments C1-C6, further comprising broadcasting, in the target cell, a second indication of whether UEs in the target cell should delete at least one of the following from their respective stored context information related to released MR-DC:

all context information;

all lower-layer configurations;

all higher-layer configurations;

all configurations associated with the SN;

configurations associated with SN PDCP entities;

configurations associated with all SN-terminated bearers;

configurations associated with SN-terminated master cell group (MCG) bearers; and configurations associated with SN-terminated secondary cell group (SCG) bearers.

C9. The method of any of embodiments C1-C8, wherein the second message includes a MR-DC configuration for the UE's connection to the wireless network.

D1. A user equipment (UE) configured for multi-radio access technology dual-connectivity (MR-DC) with a master node (MN) and a secondary node (SN) in a wireless network, the UE comprising:

communication interface circuitry configured to communicate a plurality of nodes in the wireless network; and processing circuitry operatively coupled to the communication interface circuitry, whereby the processing circuitry and the communication interface circuitry are configured to perform operations corresponding to the methods of any of embodiments A1-A11.

D2. A user equipment (UE) configured for multi-radio access technology dual-connectivity (MR-DC) with a master node (MN) and a secondary node (SN) in a wireless network, the UE being further configured to perform operations corresponding to the methods of any of embodiments A1-A11.

D3. A non-transitory, computer-readable medium storing computer-executable instructions that, when executed by processing circuitry of a user equipment (UE) configured for multi-radio access technology dual-connectivity (MR-DC) with a master node (MN) and a secondary node (SN) in a wireless network, configure the UE to perform operations corresponding to the methods of any of embodiments A1-A11.

D4. A computer program product comprising computer-executable instructions that, when executed by processing circuitry of a user equipment (UE) configured for multi-radio access technology dual-connectivity (MR-DC) with a master node (MN) and a secondary node (SN) in a wireless network, configure the UE to perform operations corresponding to the methods of any of embodiments A1-A11.

E1. A network node configured as a master node (MN) for a user equipment's (UE) multi-radio access technology dual-connectivity (MR-DC) with a wireless network, the network node comprising:

communication interface circuitry configured to communicate with the UEs and with one or more further nodes in the wireless network; and processing circuitry operatively coupled to the communication interface circuitry, whereby the processing circuitry and the communication interface circuitry are configured to perform operations corresponding to any of the methods of embodiments B1-B10.

E2. A network node configured as a master node (MN) for a user equipment's (UE) multi-radio access technology dual-connectivity (MR-DC) with a wireless network, the network node being further configured to perform operations corresponding to any of the methods of embodiments B1-B10.

E3. A non-transitory, computer-readable medium storing computer-executable instructions that, when executed by processing circuitry of a network node configured as a master node (MN) for a user equipment's (UE) multi-radio access technology dual-connectivity (MR-DC) with a wireless network, configure the network node to perform operations corresponding to any of the methods of embodiments B1-B10.

E4. A computer program product comprising computer-executable instructions that, when executed by processing circuitry of a network node configured as a master node (MN) for a user equipment's (UE) multi-radio access technology dual-connectivity (MR-DC) with a wireless network, configure the network node to perform operations corresponding to any of the methods of embodiments B1-B10.

F1. A network node configured as a target node for a user equipment (UE) to resume a suspended connection with a wireless network, the network node comprising:

communication interface circuitry configured to communicate with the UE and with one or more further nodes in the wireless network; and processing circuitry operatively coupled to the communication interface circuitry, whereby the processing circuitry and the communication interface circuitry are configured to perform operations corresponding to any of the methods of embodiments C1-C9.

F2. A network node configured as a target node for a user equipment (UE) to resume a suspended connection with a wireless network, the network node being further configured to perform operations corresponding to any of the methods of embodiments C1-C9.

F3. A non-transitory, computer-readable medium storing computer-executable instructions that, when executed by processing circuitry of a network node configured as a target node for a user equipment (UE) to resume a suspended connection with a wireless network, configure the network node to perform operations corresponding to any of the methods of embodiments C1-C9.

F4. A computer program product comprising computer-executable instructions that, when executed by processing circuitry of a network node configured as a target node for a user equipment (UE) to resume a suspended connection with a wireless network, configure the network node to perform operations corresponding to any of the methods of embodiments C1-C9.

The invention claimed is:

1. A method for a user equipment, UE, configured for multi-radio access technology dual-connectivity, MR-DC, with a wireless network, which UE stores context information related to the UE's MR-DC, the stored context information including a configuration associated with a secondary node, SN, for the UE's MR-DC, the method comprising:

receiving, from a first network node configured as a master node for the UE's MR-DC, a first message that instructs the UE to release MR-DC and to suspend the UE's connection with the wireless network, and comprising a first indication to discard one or more of the stored context information related to the UE's MR-DC;

in response to the first message, releasing the MR-DC and suspending the UE's connection with the wireless network; and discarding at least part of the stored context information related to the UE's MR-DC, in response to one of the following:

receiving the first message;

a first indication to update stored context information related to the UE's MR-DC, the first indication being included in or with the first message; or a second indication received from a second network node that is a target node for resuming the UE's connection with the wireless network, the first message including an MR-DC configuration but not including the second indication; and the target node broadcasting, in the target cell, an indication of whether each UE that attempts to resume a connection with the wireless network in the target cell, should discard one or more of the following information from the UE's stored context information related to MR-DC:

all of the UE's stored context information related to MR-DC;

all lower-layer configurations related to MR-DC;

all higher-layer configurations related to MR-DC;

all of the UE's configuration associated with the SN;

configurations associated with one or more SN packet data convergence protocol, PDCP, entities;

configurations associated with one or more SN-terminated bearers;

configurations associated with one or more SN-terminated master cell group, MCG, bearers; and configurations associated with one or more SN-terminated secondary cell group, SCG, bearers.

2. The method of claim 1, wherein discarding at least part of the stored context information is responsive to the first indication, which is included in the first message.

3. The method of claim 2, wherein the first message is an RRCRelease message.

4. The method of claim 2, wherein the first message is an RRCReconfiguration message.

5. The method of claim 1, wherein discarding at least part of the stored context information is responsive to the second indication, which is received according to one of the following: included in or with the second message, or via broadcast in the target cell.

6. The method of claim 5, wherein the second message includes an MR-DC configuration for the UE's connection with the wireless network.

7. The method of claim 1, wherein discarding at least part of the stored context information related to the UE's MR-DC comprises discarding one or more of the following information from the stored context information:

all of the stored context information;

all lower-layer configurations related to the UE's MR-DC;

all higher-layer configurations related to the UE's MR-DC;

all of the configuration associated with the SN;

configurations associated with one or more SN packet data convergence protocol, PDCP, entities;

configurations associated with one or more SN-terminated bearers;

configurations associated with one or more SN-terminated master cell group, MCG, bearers; and configurations associated with one or more SN-terminated secondary cell group, SCG, bearers.

8. The method of claim 7, wherein discarding at least part of the stored context information is responsive to one of the first and second indications, which indicates the information to be discarded from the stored context information.

9. The method of claim 1, wherein updating the first network node's stored context information is performed in accordance with the first indication sent to the UE.

10. A method for a first network node configured to operate as a master node, MN, for a user equipment's, UE's, multi-radio access technology dual-connectivity, MR-DC, with a wireless network, which first network node stores context information related to the UE's MR-DC, the stored context information including a configuration associated with a secondary node, SN, for the UE's MR-DC, the method comprising:

sending, to the UE, a message instructing the UE to release MR-DC and suspend the UE's connection with the wireless network, and comprising a first indication to discard one or more of the stored context information related to the UE's MR-DC;

updating the first network node's stored context information in response to releasing the MR-DC and suspending the UE's connection with the wireless network, including discarding at least part of the configuration associated with the SN; and sending the updated context information related to the UE's MR-DC to a second network node that is a target node for resuming the UE's connection with the wireless network, the message including an MR-DC configuration but not including the second indication; and the target node broadcasting, in the target cell, an indication of whether each UE that attempts to resume a connection with the wireless network in the target cell, should discard one or more of the following information from the UE's stored context information related to MR-DC:

all of the UE's stored context information related to MR-DC;

all lower-layer configurations related to MR-DC;

all higher-layer configurations related to MR-DC;

all of the UE's configuration associated with the SN;

configurations associated with one or more SN packet data convergence protocol, PDCP, entities;

configurations associated with one or more SN-terminated bearers;

configurations associated with one or more SN-terminated master cell group, MCG, bearers; and configurations associated with one or more SN-terminated secondary cell group, SCG, bearers.

11. The method of claim 10, wherein the message includes a first indication for the UE to update stored context information related to the UE's MR-DC, including discarding at least part of the UE's configuration associated with the SN.

12. The method of claim 10, wherein updating the first network node's stored context information comprises adding, to the first network node's stored context information, a third indication of whether the UE has discarded one or more of the following from the UE's stored context information related to the UE's MR-DC:

all of the UE's context information related to the UE's MR-DC;

all lower-layer configurations related to the UE's MR-DC;

all higher-layer configurations related to the UE's MR-DC;

all of the UE's configuration associated with the SN;

configurations associated with one or more SN packet data convergence protocol, PDCP, entities;

configurations associated with one or more SN-terminated bearers;

configurations associated with one or more SN-terminated master cell group, MCG, bearers; and configurations associated with one or more SN-terminated secondary cell group, SCG, bearers.

13. The method of claim 12, wherein updating the first network node's stored context information is performed in accordance with the third indication included in the updated context information sent to the second network node.

14. The method of claim 10, wherein the message is an RRCRelease message.

15. The method of claim 10, wherein the message is an RRCReconfiguration message.

16. A method for a second network node configured to operate as a target node for resuming a user equipment's, UE's, connection with a wireless network, the method comprising:

receiving from the UE a request to resume the UE's connection with the wireless network in a target cell served by the second network node, wherein the UE was in multi-radio access technology dual-connectivity, MR-DC, with the wireless network before the UE's connection with the wireless network was suspended;

receiving context information related to the UE's MR-DC from a first network node configured as a master node, MN, for the UE's MR-DC, wherein the received context information excludes at least part of a configuration associated with a secondary node, SN, for the UE's MR-DC; and based on the received context information, sending to the UE a message instructing the UE to resume the UE's connection with the wireless network, the message including one or more of the following:

an MR-DC configuration for the UE's connection with the wireless network, and a second indication of whether the UE should discard at least part of the configuration associated with the SN from the UE's stored context information related to the MR-DC, the message including the MR-DC configuration but not including the second indication; and the method further comprising broadcasting, in the target cell, an indication of whether each UE that attempts to resume a connection with the wireless network in the target cell, should discard one or more of the following information from the UE's stored context information related to MR-DC:

all of the UE's stored context information related to MR-DC;

all lower-layer configurations related to MR-DC;

all higher-layer configurations related to MR-DC;

all of the UE's configuration associated with the SN;

configurations associated with one or more SN packet data convergence protocol, PDCP, entities;

configurations associated with one or more SN-terminated bearers;

configurations associated with one or more SN-terminated master cell group, MCG, bearers; and configurations associated with one or more SN-terminated secondary cell group, SCG, bearers.

17. The method of claim 16, wherein the received context information includes a third indication of whether the UE has discarded at least part of the configuration associated with the SN from the UE's stored context information related to the MR-DC.

18. The method of claim 17, wherein one of the following applies:

the received context information has been updated by the first network node in accordance with the third indication; or the method further comprises updating the received context information in accordance with the third indication.

19. The method of claim 17, wherein the third indication indicates whether the UE has discarded one or more of the following from the UE's stored context information related to the UE's MR-DC:

all of the UE's stored context information related to the UE's MR-DC;

all lower-layer configurations related to the UE's MR-DC;

all higher-layer configurations related to the UE's MR-DC;

all of the UE's configuration associated with the SN;

configurations associated with one or more SN packet data convergence protocol, PDCP, entities;

configurations associated with one or more SN-terminated bearers;

configurations associated with one or more SN-terminated master cell group, MCG, bearers; and configurations associated with one or more SN-terminated secondary cell group, SCG, bearers.

20. The method of claim 17, wherein the second message includes the second indication and the method further comprises:

based on the third indication, determining a misalignment between one or more parts of the received context information and corresponding one or more parts of the UE's stored context information related to the UE's MR-DC; and determining the second indication based on the determined misalignment.

21. The method of claim 20, wherein the second indication indicates that the UE should discard one or more of the following from the UE's stored context information related to the UE's MR-DC:

all of the UE's stored context information related to the MR-DC all lower-layer configurations related to the UE's MR-DC;

all higher-layer configurations related to the UE's MR-DC;

all of the UE's configuration associated with the SN;

configurations associated with one or more SN packet data convergence protocol, PDCP, entities;

configurations associated with one or more SN-terminated bearers;

configurations associated with one or more SN-terminated master cell group, MCG, bearers; and configurations associated with one or more SN-terminated secondary cell group, SCG, bearers.

22. A user equipment, UE configured for multi-radio access technology dual-connectivity, MR-DC, with a wireless network, which UE is configured to store context information related to the UE's MR-DC, the stored context information including a configuration associated with a secondary node, SN, for the UE's MR-DC, the UE being further configured to:

receive, from a first network node configured as a master node for the UE's MR-DC, a first message that instructs the UE to release MR-DC and to suspend the UE's connection with the wireless network, and comprising a first indication to discard one or more of the stored context information related to the UE's MR-DC;

in response to the first message, release the MR-DC and suspend the UE's connection with the wireless network; and discard at least part of the stored context information related to the UE's MR-DC, in response to one of the following:

receiving the first message;

a first indication to update stored context information related to the UE's MR-DC connection, the first indication being included in or with the first message; or a second indication received from a second network node that is a target node for resuming the UE's connection with the wireless network, the first message including an MR-DC configuration but not including the second indication; and the target node broadcasting, in the target cell, an indication of whether each UE that attempts to resume a connection with the wireless network in the target cell, should discard one or more of the following information from the UE's stored context information related to MR-DC:

all of the UE's stored context information related to MR-DC;

all lower-layer configurations related to MR-DC;

all higher-layer configurations related to MR-DC;

all of the UE's configuration associated with the SN;

configurations associated with one or more SN packet data convergence protocol, PDCP, entities;

configurations associated with one or more SN-terminated bearers;

configurations associated with one or more SN-terminated master cell group, MCG, bearers; and configurations associated with one or more SN-terminated secondary cell group, SCG, bearers.

23. A first network node configured as a master node, MN, for a user equipment, UE in multi-radio access technology dual-connectivity, MR-DC, with a wireless network, which first network node is configured to store context information related to the UE's MR-DC, the stored context information including a configuration associated with a secondary node, SN, for the UE's MR-DC, the first network node being further configured to:

send, to the UE, a message instructing the UE to release MR-DC and suspend the UE's connection with the wireless network, and comprising a first indication to discard one or more of the stored context information related to the UE's MR-DC;

update the first network node's stored context information in response to releasing the MR-DC and suspending the UE's connection with the wireless network, including discarding at least part of the configuration associated with the SN; and send the updated context information related to the UE's MR-DC to a second network node that is a target node for resuming the UE's connection with the wireless network, the message includes an MR-DC configuration but does not include the second indication; and the target node broadcasts, in the target cell, an indication of whether each UE that attempts to resume a connection with the wireless network in the target cell, should discard one or more of the following information from the UE's stored context information related to MR-DC:

all of the UE's stored context information related to MR-DC;

all lower-layer configurations related to MR-DC;

all higher-layer configurations related to MR-DC;

all of the UE's configuration associated with the SN;

configurations associated with one or more SN packet data convergence protocol, PDCP, entities;

configurations associated with one or more SN-terminated bearers;

configurations associated with one or more SN-terminated master cell group, MCG, bearers; and configurations associated with one or more SN-terminated secondary cell group, SCG, bearers.

24. A second network node configured as a target node for a user equipment, UE to resume a suspended connection with a wireless network, the second network node being further configured to:

receive from the UE a request to resume the UE's connection with the wireless network in a target cell served by the second network node, wherein the UE was in multi-radio access technology dual-connectivity, MR-DC, with the wireless network before the UE's connection with the wireless network was suspended;

receive context information related to the UE's MR-DC from a first network node configured as a master node, MN, for the UE's MR-DC, wherein the received context information excludes at least part of a configuration associated with a secondary node, SN, for the UE's MR-DC; and based on the received context information, send to the UE a message instructing the UE to resume the UE's connection with the wireless network, the message including one or more of the following:

an MR-DC configuration for the UE's connection with the wireless network, and a second indication of whether the UE should discard at least part of the configuration associated with the SN from the UE's stored context information related to the MR-DC, the message including the MR-DC configuration but not including the second indication; and the method further comprising broadcasting, in the target cell, an indication of whether each UE that attempts to resume a connection with the wireless network in the target cell, should discard one or more of the following information from the UE's stored context information related to MR-DC:

all of the UE's stored context information related to MR-DC;

all lower-layer configurations related to MR-DC;

all higher-layer configurations related to MR-DC;

all of the UE's configuration associated with the SN;

configurations associated with one or more SN packet data convergence protocol, PDCP, entities;

configurations associated with one or more SN-terminated bearers;

configurations associated with one or more SN-terminated master cell group, MCG, bearers; and configurations associated with one or more SN-terminated secondary cell group, SCG, bearers.

* * * * *